United States Patent
Akazawa

(10) Patent No.: US 10,782,702 B2
(45) Date of Patent: Sep. 22, 2020

(54) ROBOT CLEANER AND METHOD OF CONTROLLING THE SAME

(71) Applicant: Samsung Electronics Co., Ltd, Gyeonggi-do (KR)

(72) Inventor: Yoshiaki Akazawa, Kanagawa (JP)

(73) Assignee: Samsung Electronics Co., Ltd., Suwon-si (KR)

(*) Notice: Subject to any disclaimer, the term of this patent is extended or adjusted under 35 U.S.C. 154(b) by 304 days.

(21) Appl. No.: 15/885,575

(22) Filed: Jan. 31, 2018

(65) Prior Publication Data

US 2018/0224862 A1 Aug. 9, 2018

(51) Int. Cl.
*G05D 1/02* (2020.01)
*G06K 9/32* (2006.01)
(Continued)

(52) U.S. Cl.
CPC ........ *G05D 1/0246* (2013.01); *A47L 11/4011* (2013.01); *A47L 11/4061* (2013.01); *B25J 5/007* (2013.01); *B25J 9/0003* (2013.01); *B25J 9/1666* (2013.01); *B25J 9/1697* (2013.01); *B25J 11/0085* (2013.01); *G05D 1/0214* (2013.01); *G05D 1/0274* (2013.01); *G06K 9/00375* (2013.01); *G06K 9/00664* (2013.01); *G06K 9/209* (2013.01); *G06K 9/2063* (2013.01);
(Continued)

(58) Field of Classification Search
None
See application file for complete search history.

(56) References Cited

U.S. PATENT DOCUMENTS 9,283,670 B2 3/2016 Sun et al.
9,286,810 B2 3/2016 Eade et al.
(Continued)

FOREIGN PATENT DOCUMENTS

JP H07175520 A 7/1995
JP 2005-312893 A 11/2005
(Continued)

OTHER PUBLICATIONS

International Search Report dated Aug. 1, 2018 in connection with International Patent Application No. PCT/KR2018/001215, 3 pages.
(Continued)

*Primary Examiner* — Lail A Kleinman

(57) ABSTRACT

Disclosed is a mobile robot provided to randomly store a landmark object and to set a no-entering region on the basis of a plurality of landmark objects and a method of controlling the mobile robot. The mobile robot includes a body, a moving portion configured to move the body, a memory, a collector configured to collect information on an object near the mobile robot, and a processor configured to compare the object information collected by the collector with the object information of the landmark candidate object stored in the memory and recognize a location of a landmark object which is an objective of a landmark on the basis of a result of comparison. When locations of at least two landmark objects are specified, the processor sets a no-entering region between the landmark objects and controls the moving portion to prevent the mobile robot from entering the no-entering region.

20 Claims, 24 Drawing Sheets

(51) Int. Cl.
  *G06T 7/73* (2017.01)
  *A47L 11/40* (2006.01)
  *B25J 5/00* (2006.01)
  *B25J 9/00* (2006.01)
  *B25J 9/16* (2006.01)
  *B25J 11/00* (2006.01)
  *G06K 9/00* (2006.01)
  *G06K 9/20* (2006.01)
  *G06K 9/46* (2006.01)
  *G06K 9/62* (2006.01)
  *G06K 9/78* (2006.01)

(52) U.S. Cl.
  CPC ............ *G06K 9/3216* (2013.01); *G06K 9/46* (2013.01); *G06K 9/6202* (2013.01); *G06K 9/78* (2013.01); *G06T 7/74* (2017.01); *A47L 2201/04* (2013.01); *B25J 9/00* (2013.01); *G05D 2201/0215* (2013.01); *G06T 2207/10048* (2013.01); *G06T 2207/30204* (2013.01); *Y10S 901/01* (2013.01); *Y10S 901/47* (2013.01)

(56) References Cited

U.S. PATENT DOCUMENTS

| | | | |
|---|---|---|---|
| 9,687,130 | B2 | 6/2017 | Teng et al. |
| 9,820,625 | B2 | 11/2017 | T P et al. |
| 2001/0022506 | A1 | 9/2001 | Peless et al. |
| 2004/0049877 | A1 | 3/2004 | Jones et al. |
| 2004/0062419 | A1 | 4/2004 | Roh et al. |
| 2005/0113990 | A1 | 5/2005 | Peless et al. |
| 2011/0082668 | A1* | 4/2011 | Escrig ............... G05D 1/0246 703/1 |
| 2012/0291810 | A1 | 11/2012 | Chen et al. |
| 2016/0302639 | A1* | 10/2016 | Lindhe ............... A47L 9/009 |

FOREIGN PATENT DOCUMENTS

| | | |
|---|---|---|
| JP | 2010140246 A | 6/2010 |
| JP | 2012239897 A | 12/2012 |
| JP | 2013168152 A | 8/2013 |
| JP | 2013537995 A | 10/2013 |
| JP | 2014030770 A | 2/2014 |
| JP | 2014-059737 A | 4/2014 |
| JP | 2015149013 A | 8/2015 |
| KR | 10-2014-0109175 A | 9/2014 |
| KR | 10-2015-0104311 A | 9/2015 |
| KR | 10-2016-0100951 A | 8/2016 |
| WO | 2016097900 A1 | 6/2016 |

OTHER PUBLICATIONS

Supplementary European Search Report in connection with European Application No. 18747254.3 dated Jan. 23, 2020, 8 pages.

* cited by examiner

ROBOT CLEANER AND METHOD OF CONTROLLING THE SAME

CROSS-REFERENCE TO RELATED APPLICATION

This application is related to and claims benefit of Japanese Patent Application No. 2017-018744 filed on Feb. 3, 2017; Japanese Patent Application No. 2017-204383 filed on Oct. 23, 2017; and Korean Patent Application No. 10-2017-0171444 filed on Dec. 13, 2017, the contents of which are incorporated herein by reference.

TECHNICAL FIELD

Embodiments of the present disclosure relate to a mobile robot and a method of controlling the same, and more particularly, to a mobile robot provided to randomly store a landmark object and set a no-entering region on the basis of a plurality of such landmark objects, and a method of controlling the mobile robot.

BACKGROUND

As technologies for moving a mobile robot to a determined region, there is a method of setting a no-entering region by installing a device capable of transmitting infrared (IR) light in the no-entering region and receiving the IR light using a camera, and a method of setting a no-entering region by setting a predetermined pattern as a landmark. For example, when there is a no-entering region or a no-trespassing region with respect to a mobile body, an IR light emitter is installed around an entrance of the corresponding region.

Also, there is technology of avoiding an obstacle when a mobile robot moves in a predetermined region. For example, Japanese Patent Laid-Open Publication Hei 7-175520 discloses a technology in which a mobile robot recognizes an object which is present in a movement path thereof and avoids a danger while operating.

SUMMARY

When an infrared (IR) light emitter is installed in a place without an electrical outlet, a method of powering by battery is generally applied. In this case, it is necessary to periodically replace a battery of the IR light emitter. Also, a no-entering region decreases as the battery is consumed. When it is not previously detected that the battery is completely consumed, there is a possibility of a mobile robot entering the no-entering region.

Also, it is necessary to provide a number of IR light emitters, which correspond to the places to be set as no-entering regions.

Also, when an installation place of an IR light emitter is a residence, installation of an IR light emitter may damage an exterior of a room or the IR light emitter may act as an obstacle against daily life.

Also, a technology of avoiding an obstacle, as far as it goes, corresponds to a method for a mobile robot to individually recognize the obstacle. This is different from a concept in which a mobile robot autonomously defines a moving range thereof.

Therefore, it is an aspect of the present disclosure to provide a mobile robot configured to move on the basis of a no-entering region set on the basis of a landmark object and a method of controlling the same.

Additional aspects of the present disclosure will be set forth in part in the description which follows and, in part, will be obvious from the description, or may be learned by practice of the present disclosure.

In accordance with one aspect of the present disclosure, a mobile robot includes a body, a moving portion which moves the body, a memory in which object information of a plurality of landmark candidate objects is stored, a collector which collects information on an object near the mobile robot, and a processor which compares the object information collected by the collector with the object information of the landmark candidate object stored in the memory and recognizes a location of a landmark object which is an objective of a landmark on the basis of a result of comparison. Here, when locations of at least two landmark objects are specified, the processor sets a no-entering region between the landmark objects and controls the moving portion to prevent the mobile robot from entering the set no-entering region.

The memory may store at least one landmark group obtained by grouping the plurality of landmark candidate objects, and the processor may set the no-entering region between landmark objects which belong to the same landmark group of the landmark objects.

When the location of the landmark object is recognized and then another landmark candidate object is present in the landmark group to which the landmark object belongs, the collector may collect the object information to detect whether the other landmark candidate object is present near the landmark object.

The processor may compare the object information collected by the collector with the object information of the landmark candidate object stored in the memory, may recognize a location of another landmark object which is an objective of the other landmark on the basis of a result of comparison, and may set a no-entering region between the landmark object and the other landmark object.

The processor may set a no-entering region, which connects the landmark objects to each other, between the landmark objects.

The processor may set a no-entering region with a certain area with respect to each landmark object near each landmark object and may control the moving portion to prevent the mobile robot from entering the no-entering region.

The processor, when it is confirmed that the recognized landmark object is not present in the recognized location, may remove the set no-entering region.

The collector may include at least one of an image obtainer which obtains image information with respect to a certain image capturing direction or an IR light receiver which receives IR light emitted by the landmark object.

The memory may store images of the plurality of landmark candidate objects as the object information, and the processor may compare the image information collected by the collector with the image information of the landmark candidate objects stored in the memory and may recognize a location of the landmark object which is an objective of a landmark.

The processor may separate and extract feature information of an object image which is present in the image capturing direction, obtained by the image obtainer, from a background image, and may store the feature information as feature information of the landmark object in the memory. Also, the processor may compare the feature information of the image obtained by the image obtainer with the feature information of the landmark object stored in the memory, may recognize the landmark object on the basis of a result of comparing the feature information, and may control the moving portion.

The processor may store the background image obtained by the image obtainer when the landmark object is not present in the image capturing direction, in the memory, and may extract image feature information of an object, which is present in the image capturing direction, from image information of the object obtained by the image obtainer while separating from the background image.

The processor may extract a local feature of the landmark object from the feature information of the landmark object and may store the local feature in the memory as the feature information of the landmark object.

The image obtainer may sequentially obtain images in the image capturing direction for a certain period of time, and the processor may store a local feature among the local features with respect to the object image obtained by the image obtainer, which accompanies sequential changes as the feature information of the landmark object in the memory.

The mobile robot may include a human body image database in which image features of a human body are stored. Here, the processor may store some of the local features which accompany the sequential changes, except local features of the human body, as the feature information of the landmark object in the memory.

The processor, when the object in the image capturing direction obtained by the image obtainer is asymmetrical, may control the image obtainer to obtain a plurality of pieces of image information of the object from other angles in a circumferential direction and may store the feature information of the landmark object in the memory on the basis of the plurality of pieces of obtained image information.

The mobile robot may further include a communicator which transmits a viewed image in the image capturing direction obtained by the image obtainer to a terminal device and receives landmark region information which indicates the landmark object in the viewed image from the terminal device.

The processor may store image features of the landmark object in the memory on the basis of the landmark region information. Also, the processor may compare the feature information of the image obtained by the image obtainer with the feature information of the landmark object stored in the memory. Also, the processor may recognize the landmark object on the basis of a result of comparing, by the processor, the feature information and may control the moving portion.

In accordance with another aspect of the present disclosure, a method of controlling a mobile robot includes comparing the object information collected by the collector with the object information of the landmark candidate object stored in the memory and recognizing a location of a landmark object which is an objective of a landmark on the basis of a result of comparison, setting, when locations of at least two landmark objects are recognized, a no-entering region between the landmark objects, and controlling the moving portion to prevent the mobile robot from entering the no-entering region.

The memory may store at least one landmark group obtained by grouping the plurality of landmark candidate objects. Here, the setting of the no-entering region between the landmark objects when the locations of the at least two landmark objects are recognized may include setting the no-entering region between the landmark objects which belong to the same landmark group and removing the set no-entering region when it is confirmed that the recognized landmark object is not present in the recognized location.

In accordance with still another aspect of the present disclosure, a robot cleaner includes a body, a moving portion which moves the body, a memory in which object information of a plurality of landmark candidate objects is stored, a collector which collects information on an object near the mobile robot, and a processor which compares the object information collected by the collector with the object information of the landmark candidate object stored in the memory and recognizes a location of a landmark object which is an objective of a landmark on the basis of a result of comparison. Here, when locations of at least two landmark objects are specified, the processor sets a no-entering region between the landmark objects and controls the moving portion to allow the robot cleaner to clean without entering the no-entering region.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "processor" means any device, system or part thereof that controls at least one operation, such a device may be implemented in hardware, firmware or software, or some combination of at least two of the same. It should be noted that the functionality associated with any particular processor may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

A mobile robot according to one embodiment of the present disclosure has a function 1) of extracting feature information of a landmark object randomly set by a user and storing the extracted information in a landmark feature memory, and a function 2) of recognizing the randomly set landmark object and simultaneously setting a no-entering region NR of the mobile robot on the basis of a result of recognizing the landmark object, and controlling the movement of the mobile robot so as to avoid the no-entering region NR.

When the mobile robot is an autonomously movable robot cleaner, the mobile robot may further include a function of cleaning while moving and is configured to perform the above-described function (2).

Since the function of the mobile robot cleaning while moving and control of the same may be realized by components like those in the related art (for example, refer to Japanese Patent Laid-Open Publication Hei 7-175520), drawings and detailed descriptions related thereto will be omitted herein.

Figure 1:
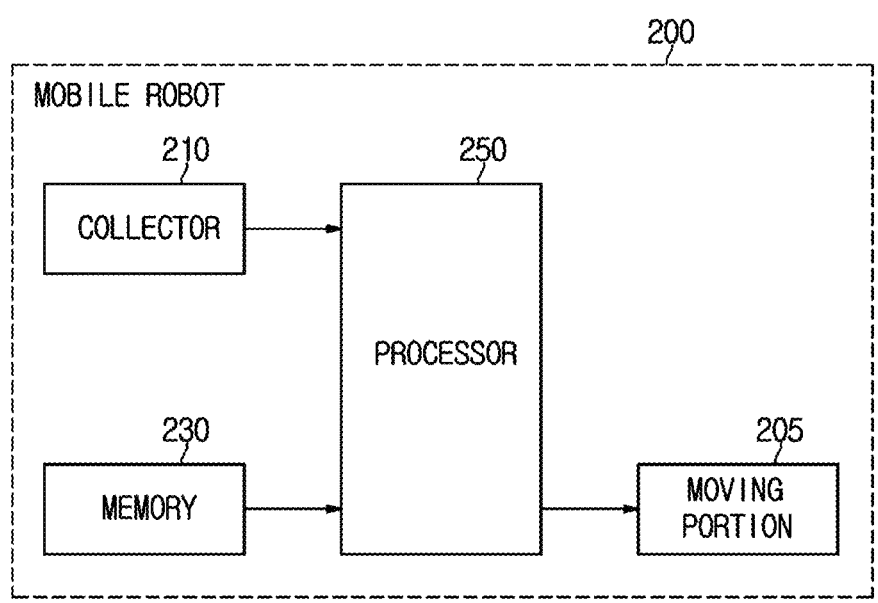
FIG. 1 is a block diagram illustrating a main configuration of a mobile robot according to one embodiment.

FIG. 1 is a block diagram illustrating a main configuration of a mobile robot according to one embodiment.

Referring to FIG. 1, a mobile robot 200 according to one embodiment includes a moving portion 205 configured to move a body of the mobile robot 200, a collector 210 configured to collect information on an object near the mobile robot 200, a memory 230 configured to store a program and data related to the operation of the mobile robot 200, and a processor 250 configured to control the operation of the mobile robot 200. In some embodiments, a user interface provided to interact with a user may be provided on a top surface of the body. The user interface may include a plurality of input buttons configured to receive a control command from the user and a display which display operation information of the mobile robot 200.

The moving portion 205 is configured to move the mobile robot 200, and in some embodiments, may include components such as a wheel-driving motor, moving wheels, casters, and the like.

The wheel driving motor may generate a rotational force which rotates the moving wheels under the control of the processor 250, and the moving wheels may receive the rotational force from the wheel driving motor and move the robot cleaner.

The collector 210 is configured to collect information on an object near the mobile robot 200 and transmit the collected object information to the processor 250. The object information collected by the collector 210 may be provided during a process of storing a random object as a landmark object or a process of recognizing a landmark object. In some embodiments, the collector 210 may include a camera sensor, an infrared (IR) light receiving device, and the like and will be described below.

The memory 230 is configured to temporarily or non-temporarily store the data and program for the operation of the mobile robot 200. For example, the memory 230 may store an application for managing the mobile robot 200. Also, the memory 230 may store map data for moving the mobile robot 200, landmark object data, image data collected by the collector 210, and the like.

The memory 230 may include at least one storage medium among a flash memory type memory, a hard disk type memory, a multimedia card micro type memory, a card type memory (for example, a secure digital (SD) memory, an extreme digital (XD) memory and the like), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk or the like. However, it is not limited thereto and may be embodied as another random type well-known in the art. In some embodiments, the memory 230 may operate a web storage configured to perform a storage function on the Internet.

The processor 250 is configured to control overall operations of the mobile robot 200. The processor 250 may control the components of the mobile robot 200, for example, the moving portion 205, the collector 210, the memory 230, and the like.

In detail, the processor 250 may perform the above-described function 1) of extracting feature information of a landmark object randomly set by the user and storing the extracted information in a landmark feature storage portion 231 and function 2) of recognizing the randomly set landmark object and simultaneously setting the no-entering region NR of the mobile robot 200 on the basis of a result of recognizing the landmark object, and controlling the movement of the mobile robot 200 to avoid the no-entering region NR.

Hereinafter, the above-described functions 1 and 2 will be sequentially described.

1. Registration of Landmark Object

Components of Mobile Robot

Figure 2:
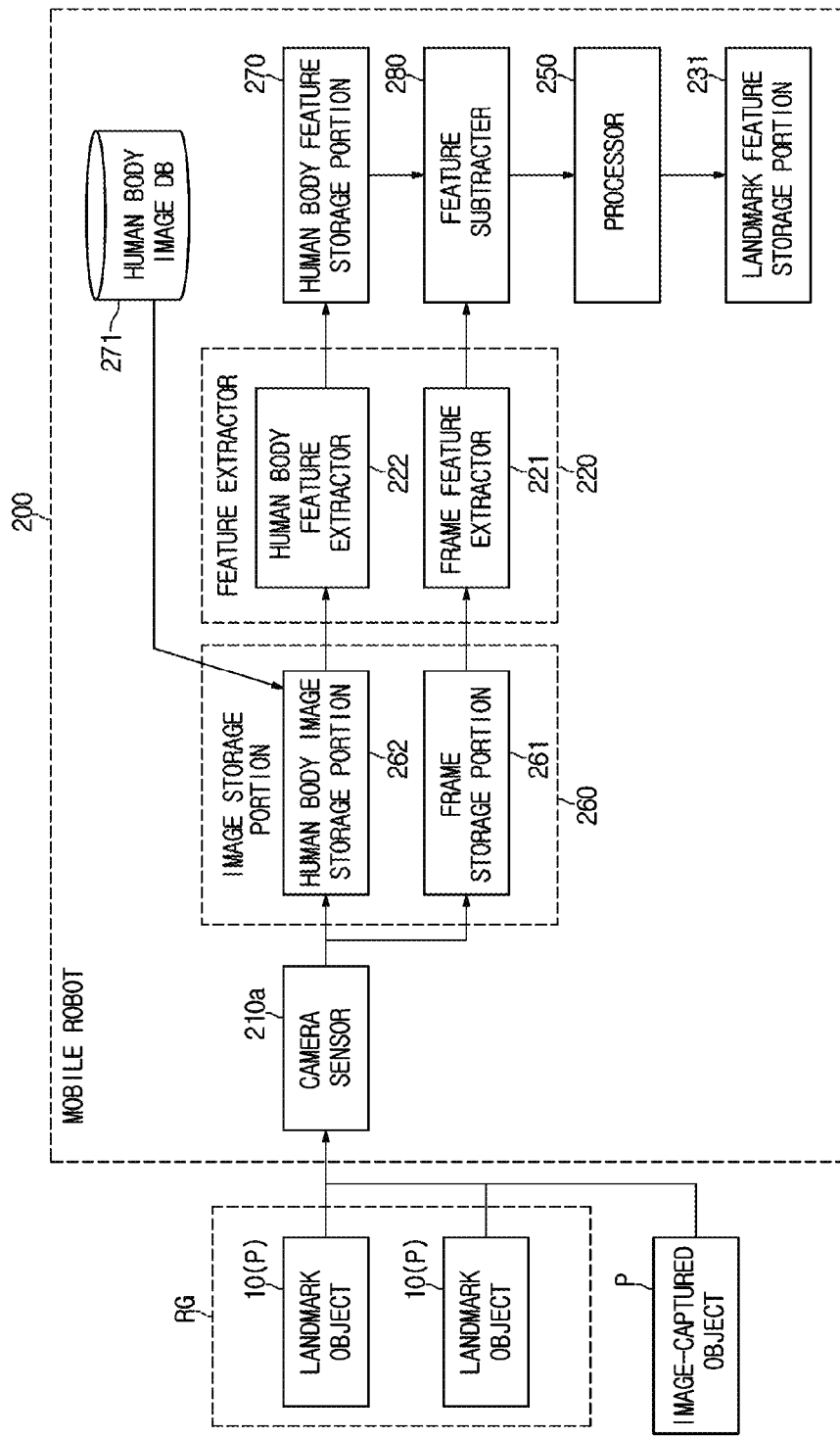
FIG. 2 is a block diagram illustrating components related to an operation of registering a landmark object, among the components of the mobile robot according to the embodiment.

FIG. 2 is a block diagram illustrating components related to an operation of registering a landmark object 10, among the components of the mobile robot 200 according to the embodiment.

As shown in FIG. 2, the mobile robot 200 includes a camera sensor 210*a* configured to collect an image, an image storage portion 260 configured to temporarily store the image obtained by the camera sensor 210*a*, a feature extractor 220 configured to extract features of the image temporarily stored in the image storage portion 260, a human body feature storage portion 270, a feature subtracter 280, the processor 250 configured to compare features, and a landmark feature storage portion 231.

The camera sensor 210*a* may be provided to obtain image information in a certain direction, for example image information of an object P disposed near the mobile robot 200. For example, the camera sensor 210*a* may be provided to obtain image information in a certain direction by being fixedly installed in advance to face the certain direction. A driving device (not shown) of the camera sensor 210*a* may be installed in the mobile robot 200 such that an image capturing direction may be adjusted. Meanwhile, the mobile robot 200 may be provided to obtain the image information in the certain direction by manipulating, by the user, a remote processor or the like or receiving detection information of an object detection sensor (not shown) mounted on its own device. In other words, the camera sensor 210*a* may be provided to obtain image information in several directions with respect to a forward direction and a direction of obtaining the image information is not particularly limited.

For example, the camera sensor 210*a* may be installed at a front of the mobile robot 200 and provided to capture an image of an object in front of the mobile robot 200. Also, a plurality of such camera sensors 210*a* may be installed at the front of the mobile robot 200 and provided to capture images of an object in an overall circumferential direction of the mobile robot 200.

The camera sensor 210*a* may obtain video type image information, and in some embodiments, may obtain a still image for each certain period. That is, an image capturing type of the camera sensor 210*a* is not particularly limited.

The image storage portion 260 is configured to temporarily store an image captured by the camera sensor 210*a*. The image storage portion 260 may include a frame storage portion 261 and a human body image storage portion 262.

The frame storage portion 261 may store an image (an image frame) captured by the camera sensor 210*a*. For example, when the camera sensor 210*a* obtains a plurality of images sequential in time, the plurality of images obtained by the camera sensor 210*a* may be stored. When the camera sensor 210*a* has captured a video, image frames of the video may be stored.

When a human body (for example, refer to FIG. 4C for a hand 80) is included in an image (an image frame) captured by the camera sensor 210*a*, the human body image storage portion 262 may cut out and store a human body region (for example, refer to of FIG. 4C for a human body region 81) in which an image of a human body is captured.

The human body image storage portion 262 may cut out and store a human body region, which is a region in which an image of a human body is captured, on the basis of difference information between an image (for example, refer to FIG. 4B) when an image of a human body is not captured by the camera sensor 210*a*.

Meanwhile, a method of cutting out and storing a human body region is not limited to the above-described example, and may be performed as a method of pre-storing a sample image of a human body in a human body image database 271 (shown as a human body image DB 271 in FIG. 2) and cutting out a human body region on the basis of a result of comparing with the pre-stored information.

The feature extractor 220 may include a frame feature extractor 221 which extracts features of an image from each image stored in the frame storage portion 261 and a human body feature extractor 222 which extracts image features of a human body region cut out and stored in the human body image storage portion 262. The image features extracted by the human body feature extractor 222 may be stored in the human body feature storage portion 270.

The feature extractor 220 is configured to extract feature information of an image within a range which allows images having different features to be identified and a form, type, and the like of the image features are not particularly limited. For example, feature information may be extracted by recognizing a shape or color of the object P as image features, or features related to changes centered in a part with great changes in color and contrast may be extracted as image features. Also, local features CP, which will be described below, may be extracted as image features.

The feature subtracter 280 may subtract image features of a human body region using image features extracted by the frame feature extractor 221 and data stored in the human body feature storage portion 270.

The processor 250, when "A. rotation registration" and "C. multi-shot registration", which will be described below, are executed, is configured to calculate the movement of image features by comparing image features of sequential image frames to confirm whether they coincide with each other. Also, on the basis of the calculated movement of image features, image features of a background region in which an image of a background is captured may be subtracted from image features extracted by the frame feature extractor 221. A detailed subtraction operation of the background region, performed by the processor 250, will be described in detail in the following section related to "Operation of Registering Landmark Object."

Meanwhile, the processor 250 may store the image features, from which the image features of the background region are subtracted, in the landmark feature storage portion 231 as image features of the landmark object 10. Here, the processor 250 may regard only image features which show notable movement as features of the landmark object 10, which may then be stored in the landmark feature storage portion 231. Using the above-described method, the accuracy of recognizing the landmark object 10 may be increased and performance related to controlling of the movement of the mobile robot 200 may be increased.

In the case of "B. One Shot Registration", the above-described comparison processing of the processor 250 is not performed, and image features on which subtraction processing is performed by the feature subtracter 280 may be directly stored in the landmark feature storage portion 231 as image features of the landmark object 10.

Operation of Registering Landmark Object

Figure 3:
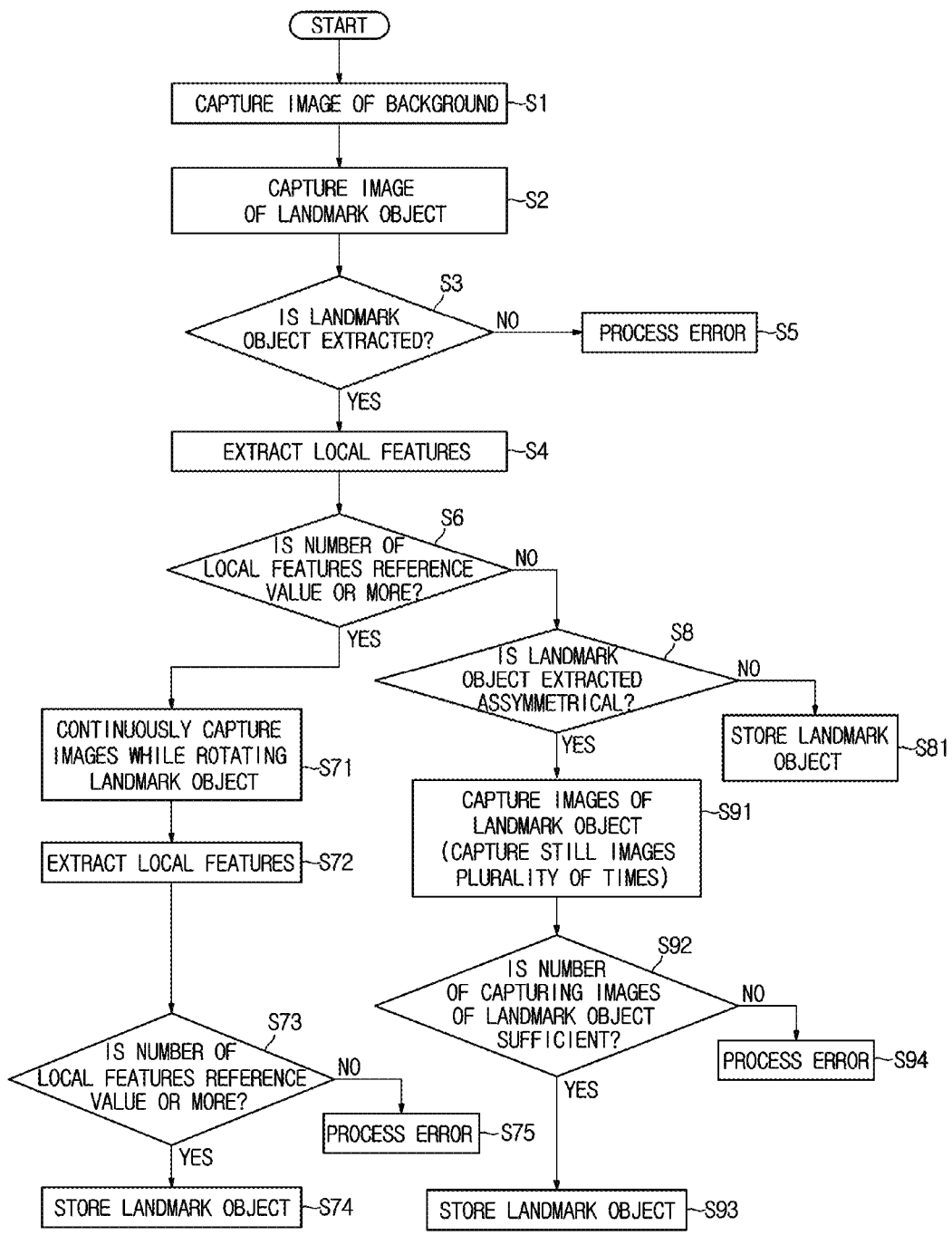
FIG. 3 is a flowchart illustrating a flow of operations by the mobile robot which registers a landmark object.

Sequentially, an operation of the mobile robot 200 registering the landmark object 10 will be described in detail with reference to FIG. 3. Hereinafter, unless particularly disclosed, an object which controls the mobile robot 200 is the processor 250.

Figure 4A:
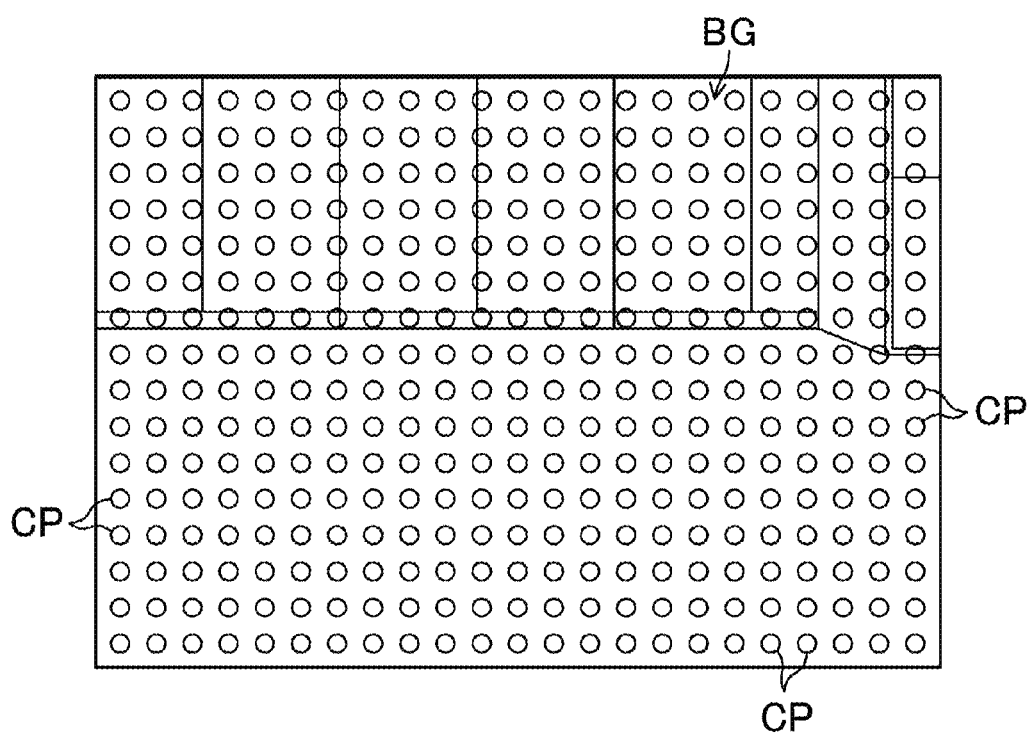
FIGS. 4A to 4G are views illustrating rotation registration.

First, in operation S1, the mobile robot 200 collects a background image when the landmark object 10 is not present, via the camera sensor 210*a*. For example, when the user inputs an operation command to store the landmark object 10 in the mobile robot 200 by using a remote processor (not shown) and the like, the processor 250 of the mobile robot 200 outputs a control command to the camera sensor 210*a* to capture a background image before installing the landmark object 10. In FIG. 4A, an example of capturing a background image is shown. In addition, in FIGS. 4A to 5, one example of the local features CP is shown as a circle and a local feature of the landmark object 10, among the local features CP, is indicated as a symbol CP1. Also, one example of a local feature CP8 of the human body region 81 is shown as a triangle. Each drawing is an example for facilitating understanding, and a plurality of such local features CP may be present in a captured image.

Figure 4B:
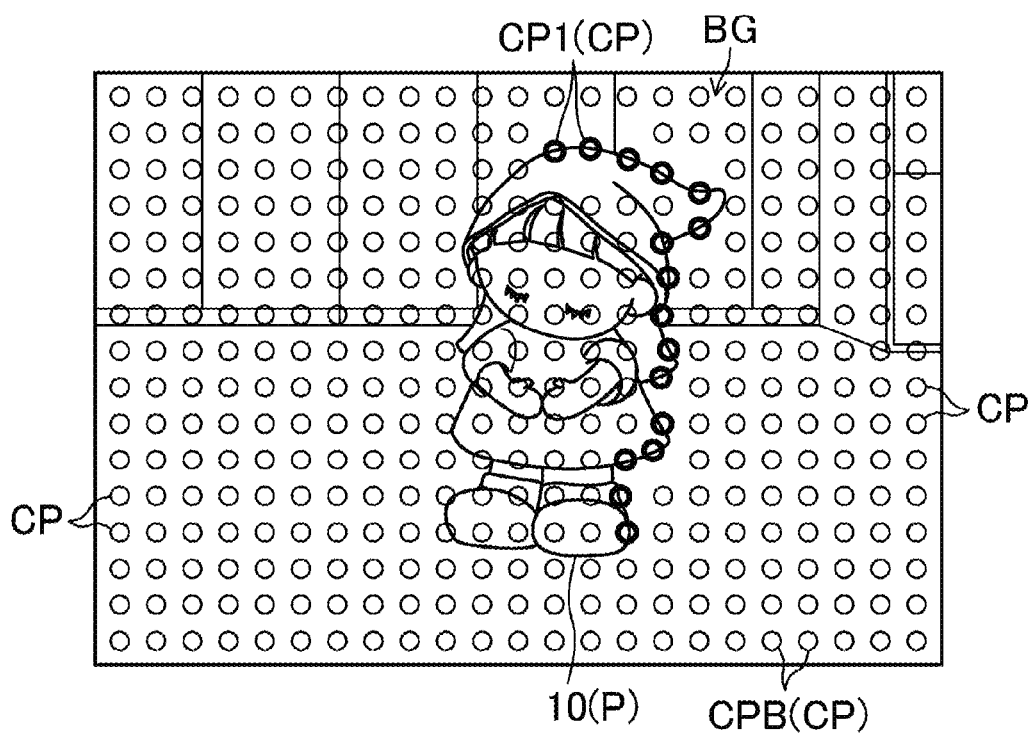

Next, in operation S2, the landmark object 10 is disposed by the user in an image capturing direction of the camera sensor 210*a* as shown in FIG. 4B, and in this state, image capturing is performed as in operation S1. For example, after the image capturing of operation S1, when the user disposes the landmark object 10 in front of the camera sensor 210*a* and notifies the mobile robot 200, the mobile robot 200 captures a background image when an image of the landmark object 10 is captured by the camera sensor 210*a*. While operations S1 and S2 are performed, the mobile robot 200 may remain in a stationary state.

Sequentially, the mobile robot 200 performs an operation of extracting the landmark object 10 from the captured image of operation S2 (refer to FIG. 4B, hereinafter, referred to as a captured image G2) by using the captured image of operation S1 (refer to FIG. 4A, hereinafter, referred to as a captured image G1). For example, the landmark object 10 may be extracted by obtaining a difference in a background of the captured image G2 on the basis of the captured image G1.

In operation S3, whether the landmark object 10 is extracted from the captured images G1 and G2 is determined, and when the landmark object 10 is extracted (Yes in S3), next, operation S4 is performed. Meanwhile, when the landmark object 10 is not extracted (No in S3), the mobile robot 200 performs error processing (S5). For example, a message which notifies the user of an error and, simultaneously, operation S1 is performed again or a message which requests rearrangement of the landmark object 10 by the user may be output.

In operation S4, a local feature as the image feature of the extracted landmark object 10 (hereinafter, referred to as a local feature CP1 of the landmark object 10) is extracted. Here, the local feature CP refers to, for example, a pattern or a noticeable structure shown in an image, and there is an edge, gradient, or the like as examples of the local feature. A general technique may be applied to basic operations related to a shape in which an individual local feature CP is extracted and a method of matching with an object is performed, and a detailed description thereof will be omitted.

When the local feature CP1 of the landmark object 10 is extracted in operation S6, a process of determining whether the number of the local features CP1 of the landmark object 10 is sufficient is performed. For example, it is determined whether the number of the local features CP1 of the landmark object 10 is a predetermined reference value or more.

When the number of the local features CP1 of the landmark object 10 is sufficient, that is, the number of the local features CP1 of the landmark object 10 is equivalent to the predetermined reference value or more (Yes in S6), "A. rotation registration" in which features of the landmark object 10 calculated on the basis of changes in the local features CP1 of the landmark object 10 while rotating the landmark object 10 are stored, is performed. Meanwhile, when the number of the local features CP1 of the landmark object 10 is insufficient, that is, the number of the local features CP1 of the landmark object 10 is less than the predetermined reference value (No in S6), operation S8 is performed. In addition, "B. One shot registration" or "C. Multi shot registration" in which an image of the landmark object 10 obtained by removing a human body region and a background region from a captured image is stored as image features of the landmark object 10, is performed.

A. Rotation Registration

Next, rotation registration will be described in detail. In FIG. 3, a rotation registration process is shown in operations S71 to S75. Hereinafter, one embodiment of the present disclosure will be described in which a user rotates the landmark object 10 with a hand, as an example.

In operation S71, the mobile robot 200 initiates capturing of sequential images by the camera sensor 210*a* and the user rotates the landmark object disposed in operation S6 during an image capturing period. FIGS. 4C to 4G illustrate examples of images captured during rotation registration.

Figure 4C:
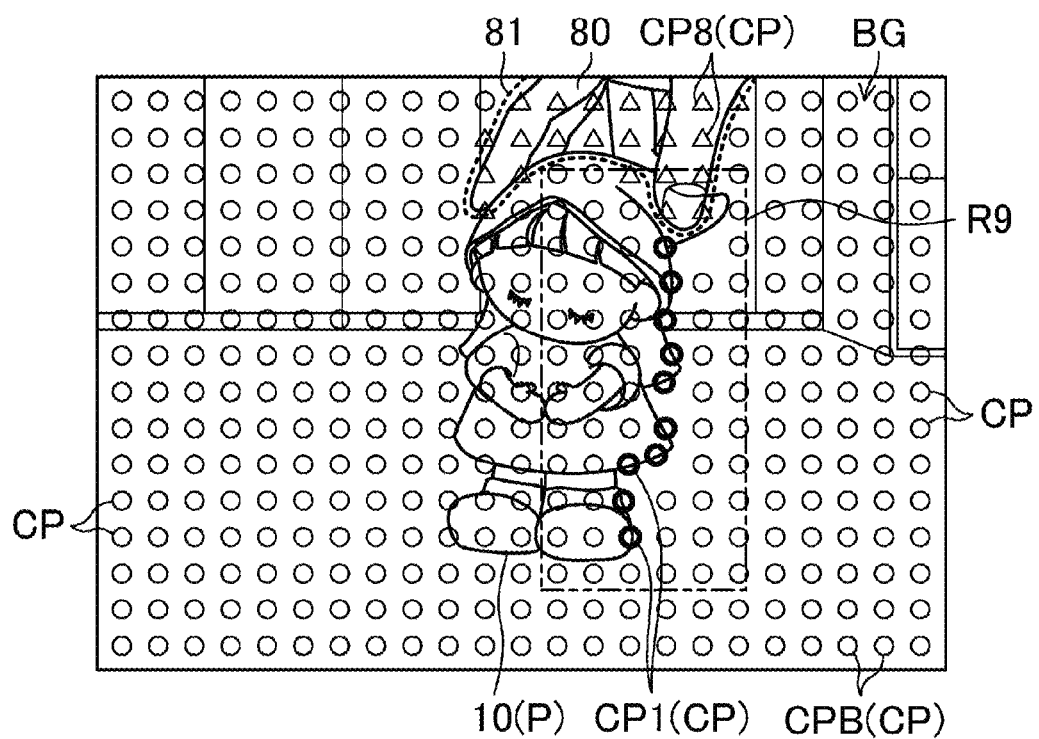
Figure 4D:
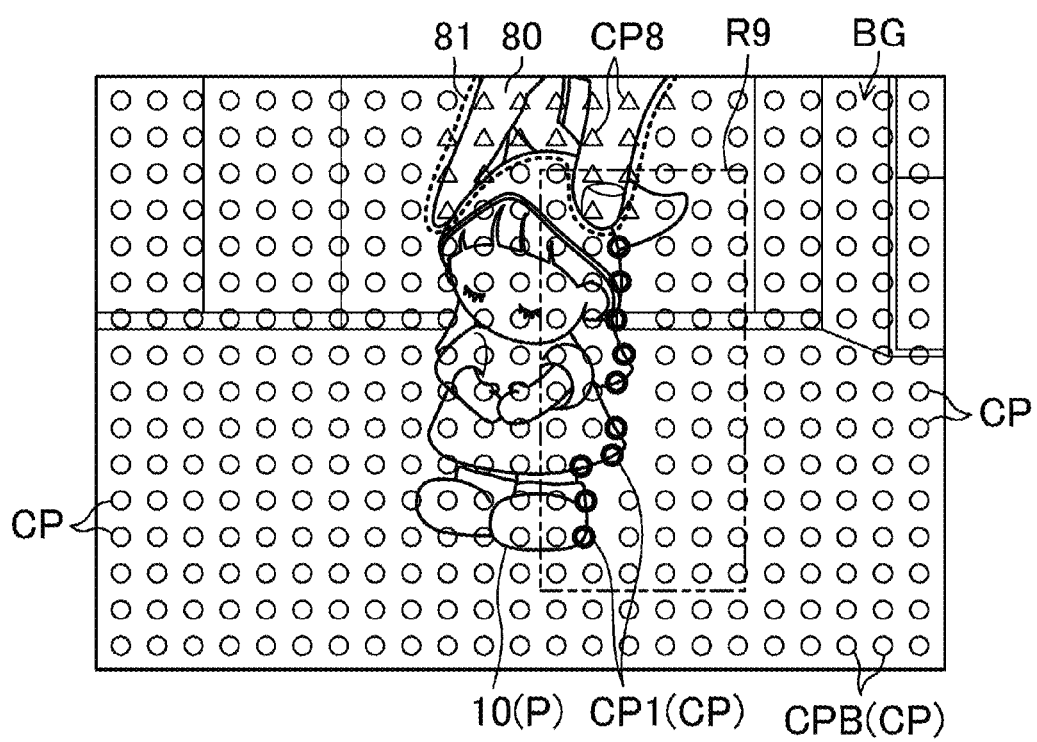
Figure 4E:
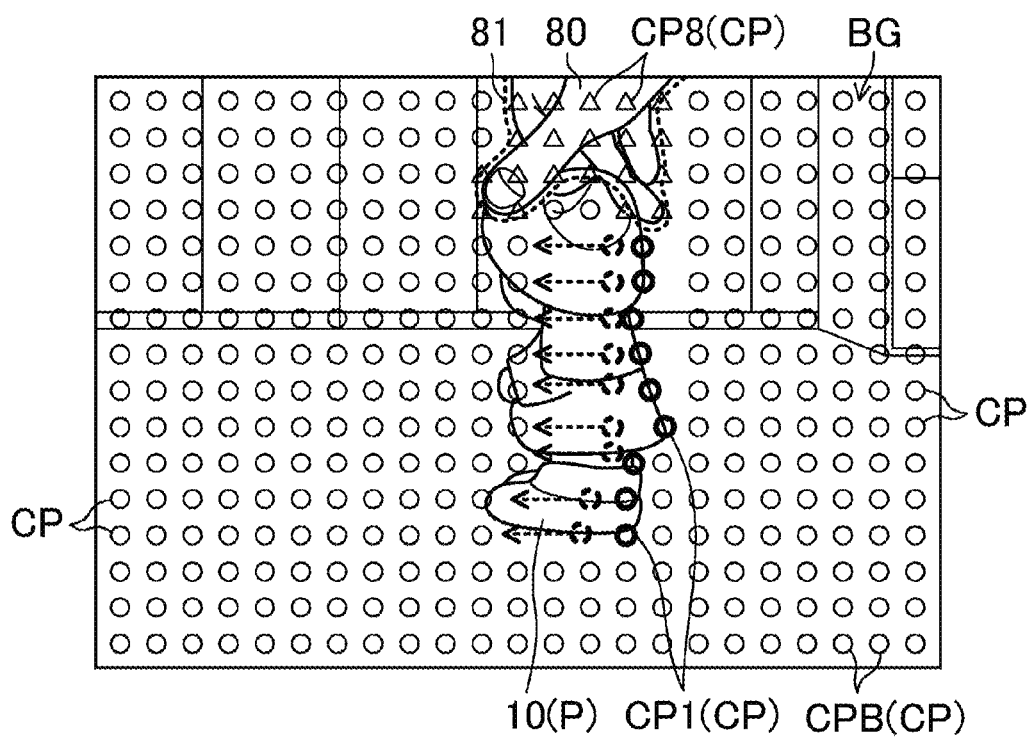
Figure 4F:
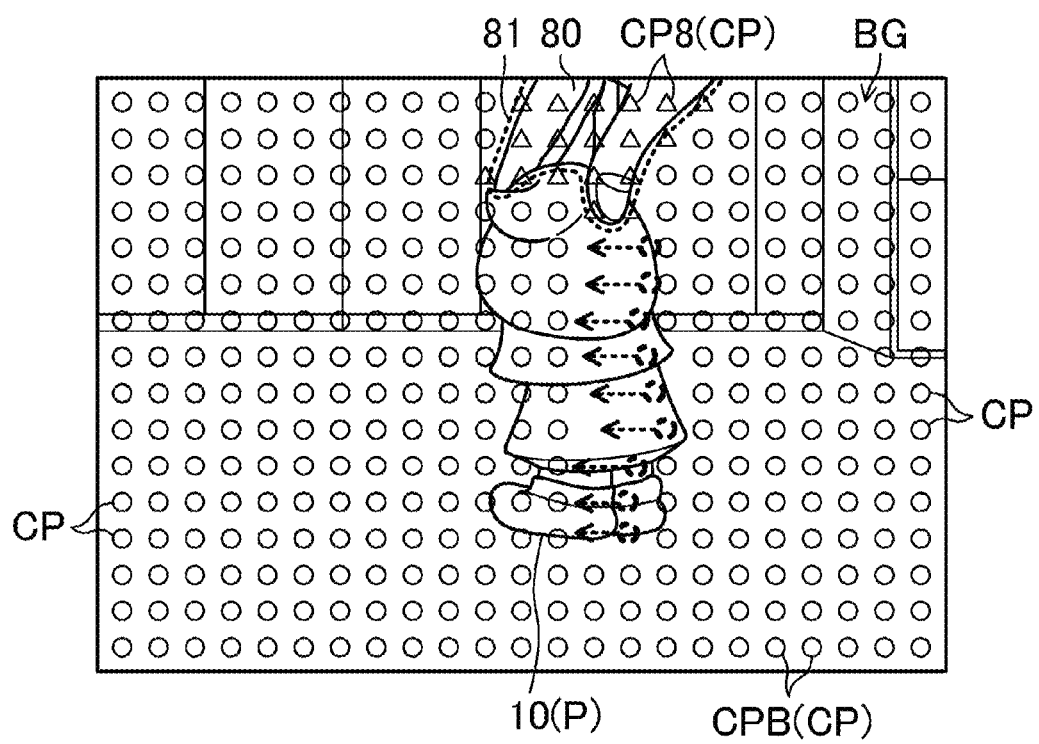
Figure 4G:
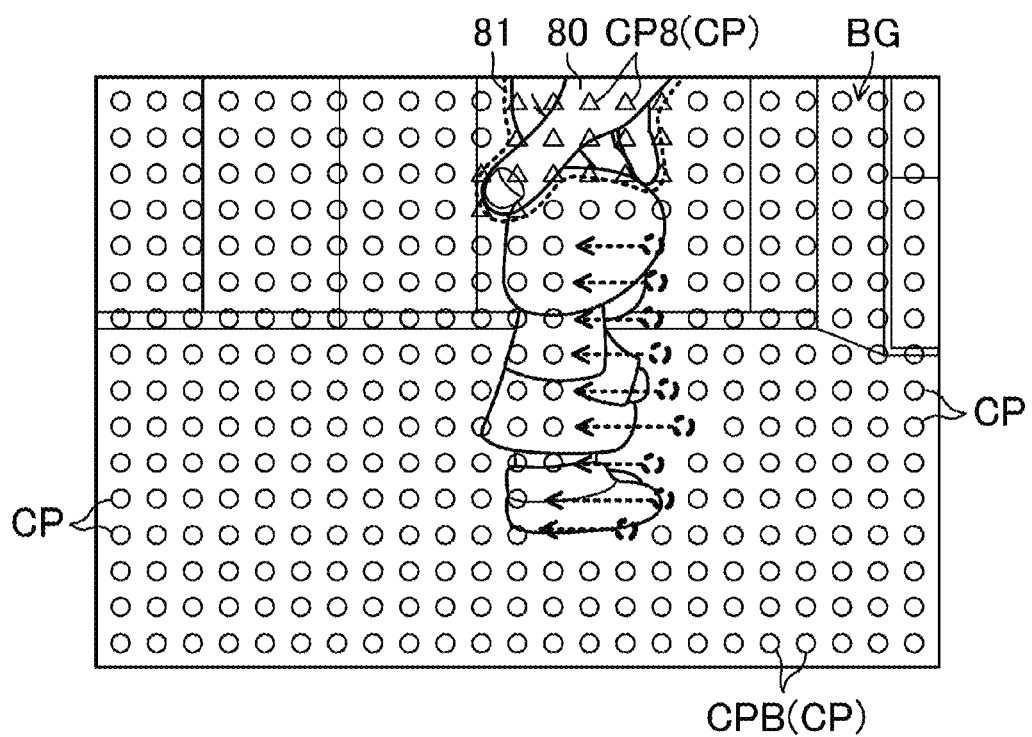
Figure 5:
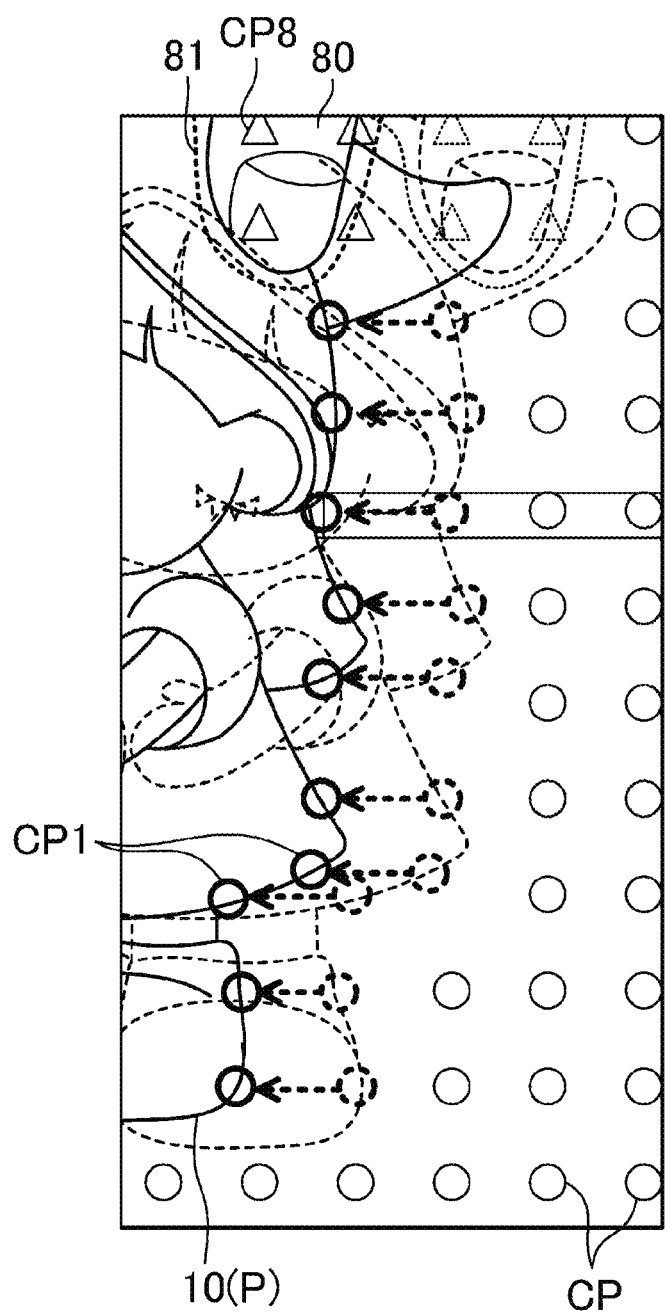
FIG. 5 is an enlarged and overlapping view illustrating a region R9 of FIGS. 4C and 4D.

In operation S72, the local features CP1 of the landmark object 10 in each image captured in operation S71 are extracted and, simultaneously, change information such as a movement amount, a movement direction, appearance/distinction, and the like of each of the local features CP1 of before and after captured images is extracted. For example, FIGS. 4C to 5 illustrate one example of the movement of the local feature CP1 of the landmark object 10 among the before and after captured images, in a thick line.

In operation S73, whether the number of local features CP1 of the landmark object 10 extracted in operation S72 is sufficient is determined. The number of local features CP1 of the landmark object 10 used in determining whether the number of local features CP1 of the landmark object 10 is sufficient in operation S73 may be, for example, set on the basis of a total sum of the local features CP1 of total images captured in operation S71 or may be set according to a separate reference. For example, a value obtained by multiplying the reference value used in operation S6 by the number of images captured in operation S71 may be used as a reference value. In some embodiments, whether the number of local features CP1 of each image captured in operation S72 exceeds a certain mean value may be a criterion.

Hereinafter, a method of extracting the local features CP1 of the landmark object 10 will be described in detail.

First, subtraction of local features CP8 of the human body region 81 will be described.

For example, as shown in FIG. 4B, when the user disposes and releases the landmark object 10 and it is possible to capture an image of a state in which an image of the hand 80 is not captured, capturing of images of the hand 80 may be detected from changes in images of FIGS. 4B and 4C. In this case, as described above, the human body region 81, which is a region in which an image of the hand 80 is captured, is cut out by the human body image storage portion 262, and the local features CP8 in the human body region 81 are extracted by the human body feature extractor 222. The local features CP8 of the human body region 81 are stored in the human body feature storage portion 270. During the rotation registration, as shown in FIGS. 4C to 4G, an image of the hand 80 is captured and simultaneously the local features CP8 of the hand 80 move. Accordingly, the local features CP8 of the human body region 81 are subtracted by the feature subtracter 280 with reference to data stored in the human body feature storage portion 270. Sample data of the human body region 81, for example, image data of a human body including a hand or local feature data, is previously stored in the human body image database 271 and added so as to subtract the local features CP8 of the human body region 81 via the feature subtracter 280. By adding sample data of the human body region 81, the accuracy of subtracting the image features CP8 of the human body region 81 may be increased. When it is impossible to capture an image of the landmark object 10 without capturing an image of the hand 80, subtraction of the image features CP8 of the human body region 81 may be performed on the basis of the sample data of the human body image database 271. Since the human body image database 271 includes the sample data, it is possible to easily determine whether the hand 80 is included in an image captured by the camera sensor 210a. When the hand 80 is distinguishable, a size of the landmark object 10 may be recognized and the accuracy of estimating a distance between the landmark object 10 and the camera sensor 210a (at the mobile robot 200) may be increased.

Next, subtraction of local features CPB of a background region BG will be described in detail.

In the rotation registration, since the landmark object 10 is rotating, the local features CP1 of the landmark object 10 moves in a rotation direction, but the local features CPB of the background region BG do not move during the operation of registering the landmark object. Accordingly, some local features CP, which do not move during the sequential image capturing operation, are among the local features CP extracted in operation S72 regarded as the local features CPB of the background region BG and subtracted.

If the number of local features CP1 of the landmark object 10 is sufficient in operation S73 ("Yes" in S73), operation S74 is performed. If the number of local features CP1 of the landmark object 10 is insufficient ("No" in S73), the mobile robot 200 performs error processing (S75). For example, when the landmark object 10 includes the local features CP1 at a front which faces the camera sensor 210a (in an initial installation state) but does not include local features CP1 on a side or a rear thereof, it is determined that the number of local features CP1 is insufficient. In operation S75, a message which notifies the user of an error and, simultaneously, operation S1 or S6 is performed again, or a message which requests rearrangement of the landmark object 10 by the user may be output.

In operation S74, the extracted local features CP1 of the landmark object 10 are stored in the landmark feature storage portion 231 as image features of the landmark object 10. Also, in operation S74, it may be possible to distinguish which local feature CP1 is added with change information of each stored local feature CP in operation S72. For example, only the local feature CP1 which shows a noticeable movement (a movement above or at a certain movement threshold) between before and after captured images may be determined to be the image feature of the landmark object 10 and may be stored in the landmark feature storage portion 231.

B. One Shot Registration

In operation S8, the mobile robot 200 determines whether a shape of the landmark object 10 extracted in operation S2 is asymmetrical. If the shape of the landmark object 10 is not asymmetrical (No in S8), operation S81 is performed and the mobile robot 200 performs one shot registration in which the image of the landmark object 10 extracted in operation S2 is stored in the landmark feature storage portion 231 as features of the landmark object 10.

If the shape of the landmark object 10 is symmetrical, even when the camera sensor 210a captures an image of the landmark object 10 in a different direction from the image capturing direction in operation S2 while the mobile robot 200 moves, a possibility of recognizing the landmark object 10 is high and accordingly the above-described one shot registration is performed when the shape of the landmark object 10 is symmetrical. When the storage in the landmark feature storage portion 231 is completed, the one shot registration is completed.

C. Multi Shot Registration

In operation S8, when the shape of the landmark object 10 is asymmetrical ("Yes" in S8), the mobile robot 200 performs multi shot registration. Operations S91 to S94 in FIG. 3 illustrate a flow of rotation registration.

In operation S91, the mobile robot 200 captures an image of the landmark object 10 at different angles multiple times through the camera sensor 210a. For example, when the user rotates the landmark object 10 by a certain angle (for example, 45 degrees) and then releases the landmark object 10 and manipulates the mobile robot 200 to capture an image, the mobile robot 200 manipulated by the user may perform an operation of capturing a still image multiple times.

In operation S92, the mobile robot 200 determines whether the number of a plurality of such still images in which the landmark object 10 is included in operation S91 is sufficient. For example, when eight still images are captured in operation S91, it is determined whether the eight still images may be used to sufficiently recognize the landmark object 10. Subsequently, if it is determined that the number of the plurality of still images in which the landmark object 10 is included is sufficient "Yes" in S92), the mobile robot 200 matches the images of the landmark object 10 extracted in operation S2 and the plurality of still images captured in operation S92, stores the features of the landmark object 10 in the landmark feature storage portion 231, and finishes the multi shot registration operation (S93). Meanwhile, if the number of the plurality of still images in which the landmark object 10 is included is insufficient ("No" in S92), operation S94 is performed and error processing is performed. In the error processing, like operation S75, a message which notifies the user of an error and, simultaneously, performs operation S1 or S6 again, or a message which requests rearrangement of the landmark object 10 by the user, may be output.

Figure 6:
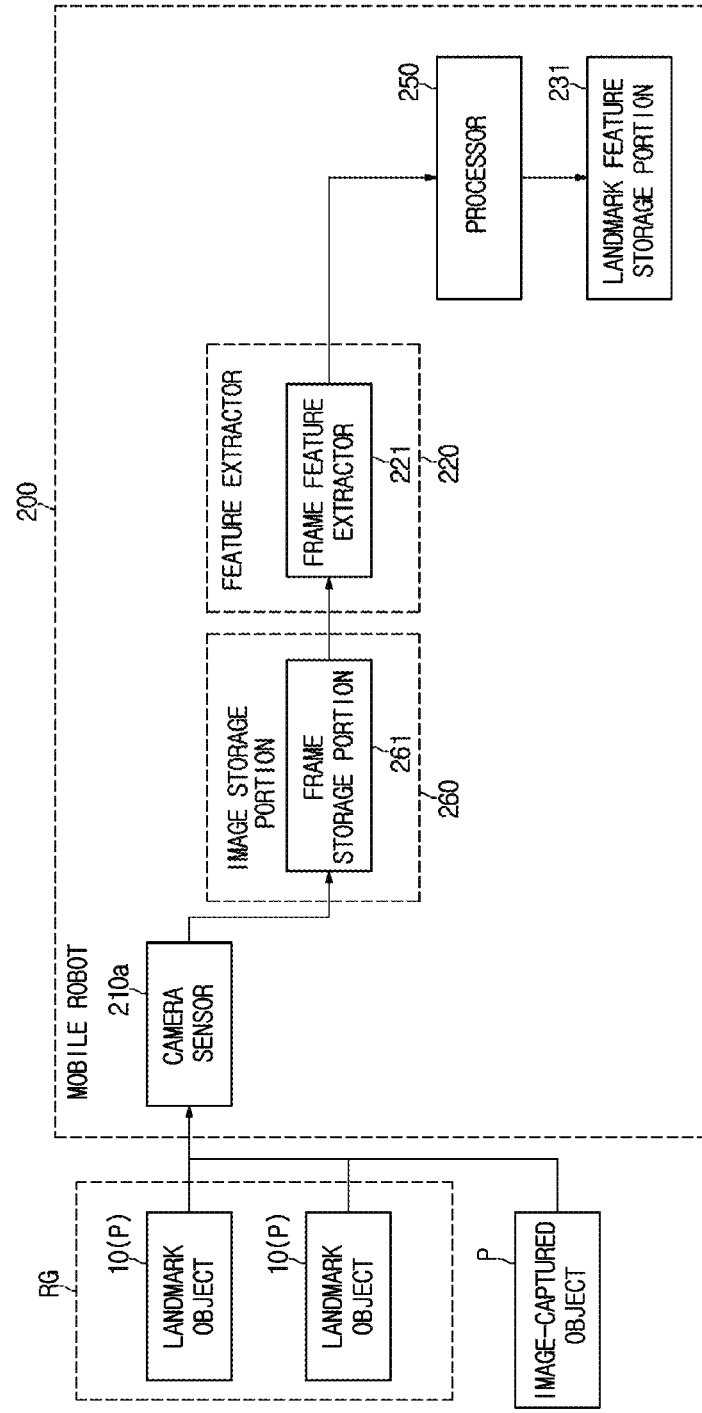
FIG. 6 is a block diagram illustrating another example of the registration operation of the mobile robot.

In "B. One Shot Registration" and "C. Multi Shot Registration", when the user releases the camera sensor 210a and moves out of an image capturing region of the camera sensor 210a, an image of a hand (human body) is not captured by the camera sensor 210a. In this case, an operation of registering the landmark object 10 may be performed by a simplified block configuration as shown in FIG. 6. Since blocks shown in FIG. 2 are referred to as the same reference numerals in FIG. 6 and substantial functions thereof are the same, a detailed description which overlaps the above description will be omitted. In FIG. 6, the human body image storage portion 262, the human body feature extractor 222, the human body feature storage portion 270, and the human body image database 271, which are blocks shown in FIG. 2 and related to subtraction of a human body region, are omitted. In "B. One shot Registration" and "C. Multi Shot Registration", when an image of a human body (for example, a hand) is captured, as described above with respect to "A. Rotation Registration", image features of a human body region may be deleted from the image features of the landmark object 10 using the captured image or the sample data of the human body image database 271 when stored in the landmark feature storage portion 231.

In "A. Rotation Registration," for example, it may be possible to prevent an image of a hand from being captured when the landmark object 10 is disposed on a rotating stand (not shown) which automatically rotates and is rotated. In this case, an operation of registering the landmark object 10 may be performed by the simplified block configuration as shown in FIG. 6.

Another Registration Method 1

Figure 7:
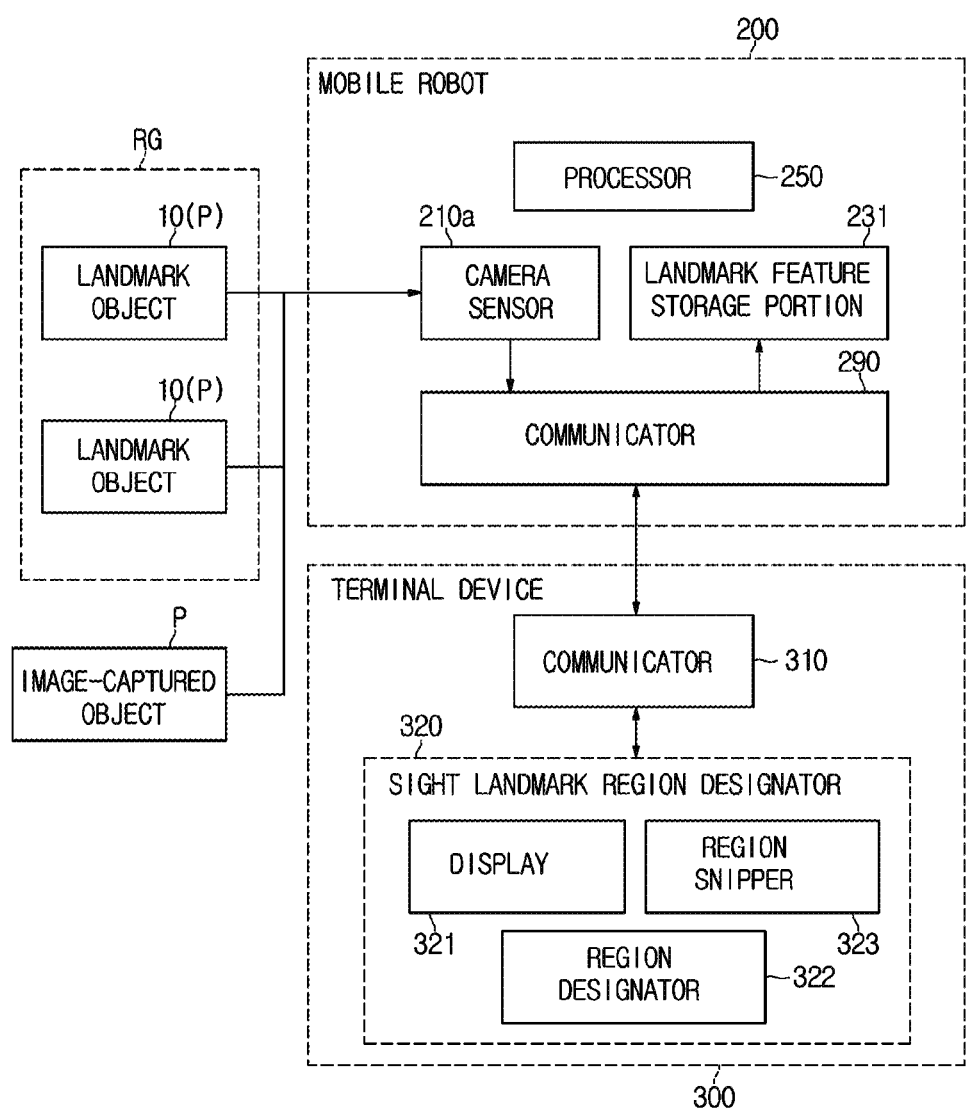
FIG. 7 is a block diagram illustrating still another example of the registration operation of the mobile robot.
Figure 8:
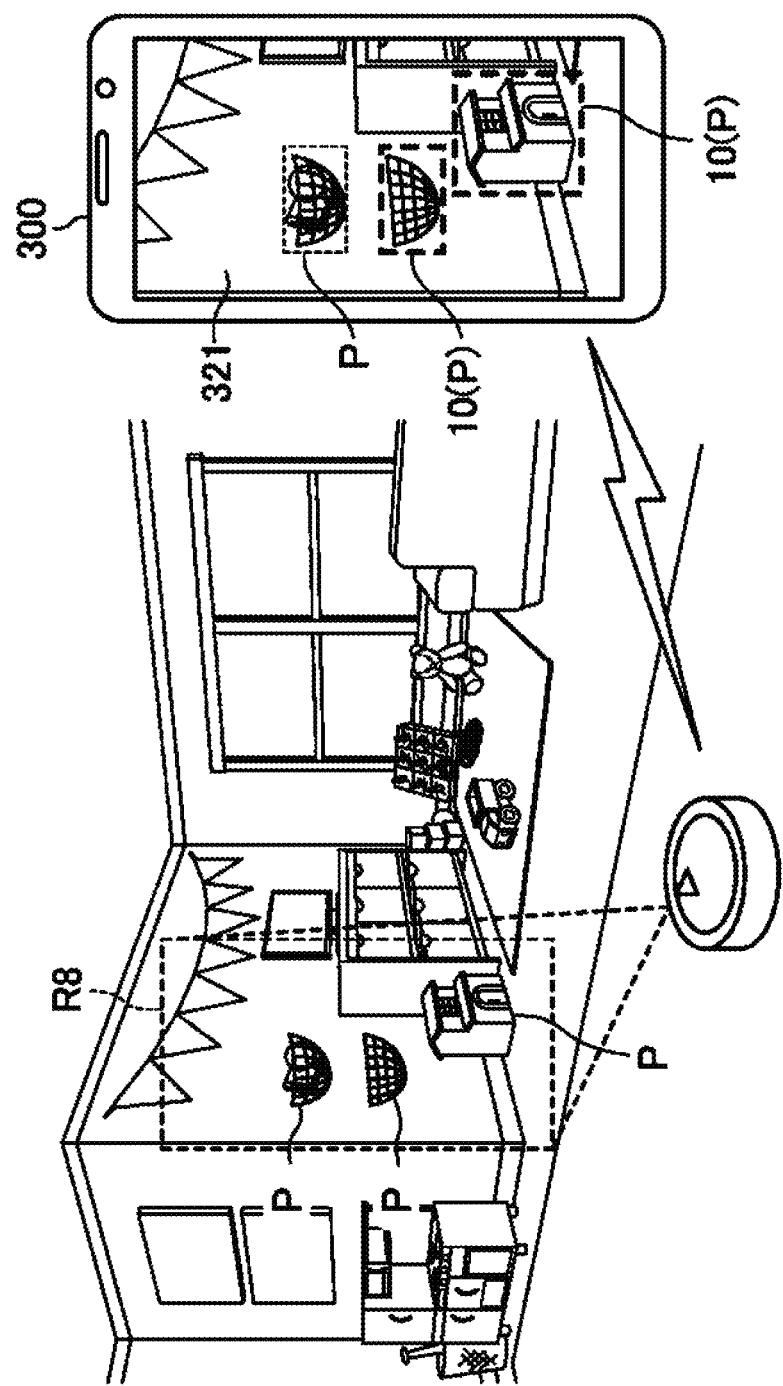
FIG. 8 is a view illustrating another registration method (1)

FIG. 7 illustrates components of the mobile robot 200 related to another registration method 1, and particularly, block components related to an operation of registering the landmark object 10.

In FIG. 7, the mobile robot 200 includes the camera sensor 210a, the landmark feature storage portion 231, the processor 250, and a communicator 290 configured to perform wireless two-way communication with a communicator 310 of a terminal device 300 which will be described below. In FIG. 7, since the functions and operations of the camera sensor 210a and the landmark feature storage portion 231 are same as those of FIG. 2, hereinafter, a detailed description thereof will be omitted. Also, the function of the processor 250 is same as that of FIG. 2 and a detailed operation will be described below in detail in the following section related to "Method of Registering Landmark Object."

The terminal device 300 includes the communicator 310 configured to perform wireless two-way communication with the communicator 290 of the mobile robot 200 and a sight landmark region designator 320. The sight landmark region designator 320 includes a display 321, a region designator 322, and a region snipper 323. An operation of the viewed landmark region designator 320 will be described in detail in the following section related to "Method of Registering Landmark Object."

Next, a method of registering a landmark object according to the shown in FIG. 7 will be described in detail.

First, an image of a random view captured by the camera sensor 210a (refer to FIG. 8 for R8) is transmitted to the sight landmark region designator 320 through both the communicators 290 and 310 of the mobile robot 200 and the terminal device 300 under the control of the processor 250.

Subsequently, the display 321 of the viewed landmark region designator 320 displays the sight image transmitted from the camera sensor 210a. The region designator 322 extracts an object P capable of being registered as the landmark object 10 from the viewed image transmitted from the camera sensor 210a and simultaneously displays a viewed landmark region (refer to FIG. 8 for a broken line region in the terminal device 300) which surrounds the object P to overlap the viewed image of the display 321. Afterwards, the region snipper 323 cuts out a viewed landmark region (refer to FIG. 8 for a thick broken line region in the terminal device 300) selected by the user from the viewed landmark region and transmits the cut-out viewed landmark region to the communicator 310.

The communicator 310 transmits image information of the viewed landmark region received from the region snipper 323 to the communicator 290 of the mobile robot 200. The processor 250 stores image features of the viewed landmark region received from the communicator 310 in the landmark feature storage portion 231 as the image features of the landmark object 10.

Another Registration Method 2

Figure 9:
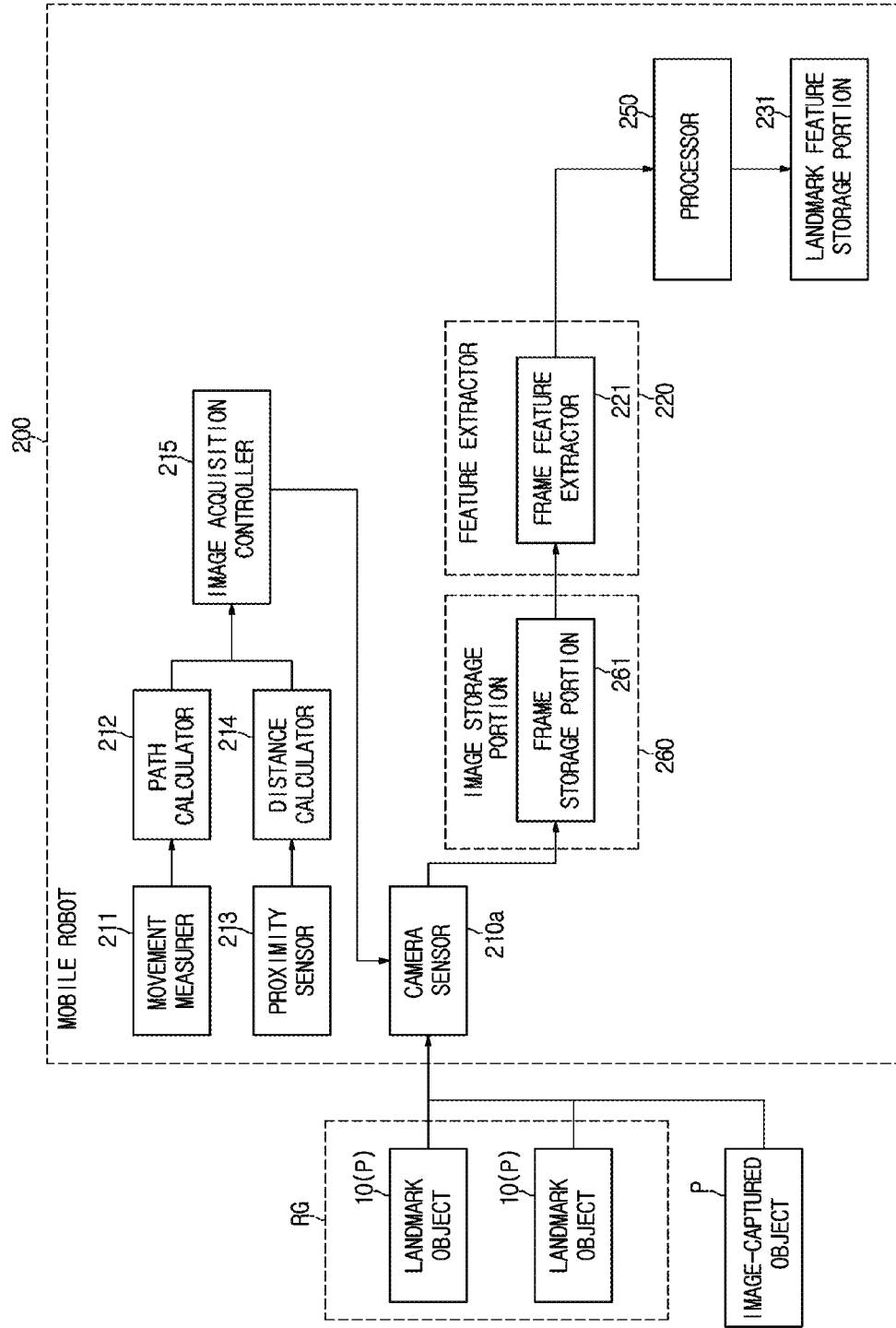
FIG. 9 is a control block diagram illustrating yet another example of the registration operation of the mobile robot.

FIG. 9 illustrates components of the mobile robot 200 related to another registration method 2, and particularly, block components related to an operation of registering the landmark object 10. Also, components and operations for storing the image features of the landmark object 10 in the landmark feature storage portion 231 on the basis of a result of image capturing using the camera sensor 210a are same as that in the above description, and hereinafter, differences in the components of FIG. 9 from the above description will be mainly described.

The mobile robot 200 further includes a movement measurer 211, a path calculator 212, a proximity sensor 213, a distance calculator 214, and an image acquisition processor 215. Also, FIG. 9 presupposes a case in which an image of a human body is not captured in a registration operation described below and is based on the block components of FIG. 6. However, when there is a possibility of capturing an image of a human body, the block components of FIG. 2 may be the basis thereof.

The movement measurer 211 is configured to measure a path on which the mobile robot 200 moves. The path calculator 212 includes a function of calculating a path to determine which path to travel on the basis of movement path information measured by the movement measurer 211. A detailed path calculation will be described below in the following section related to "Operation of Registering Landmark Object"

The proximity sensor 213 is configured to obtain information on a distance from an obstacle or the object P (including the landmark object 10) in a forward direction (image capturing direction). The distance calculator 214 is configured to estimate the distance between the mobile robot 200 and the obstacle or the object P (including the landmark object 10) by performing a calculation based on the distance information obtained by the proximity sensor 213.

The image acquisition processor 215 is configured to instruct the camera sensor 210a to capture an image when it is determined that the mobile robot 200 has moved to a location adequate for capturing an image of the object P present in the image capturing direction, on the basis of results of calculation of the path calculator 212 and the distance calculator 214.

Figure 10:
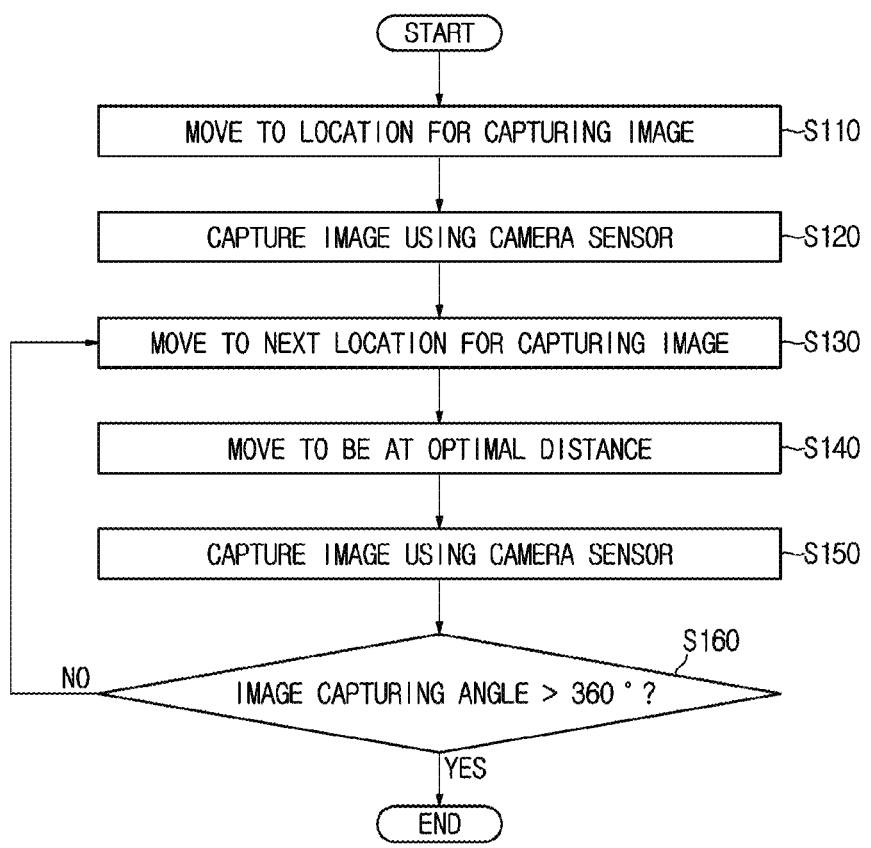
FIG. 10 is a flowchart illustrating a flow of the registration operation of the mobile robot.

Next, a method of registering the landmark object 10 will be described with reference to FIG. 10.

Figure 11:
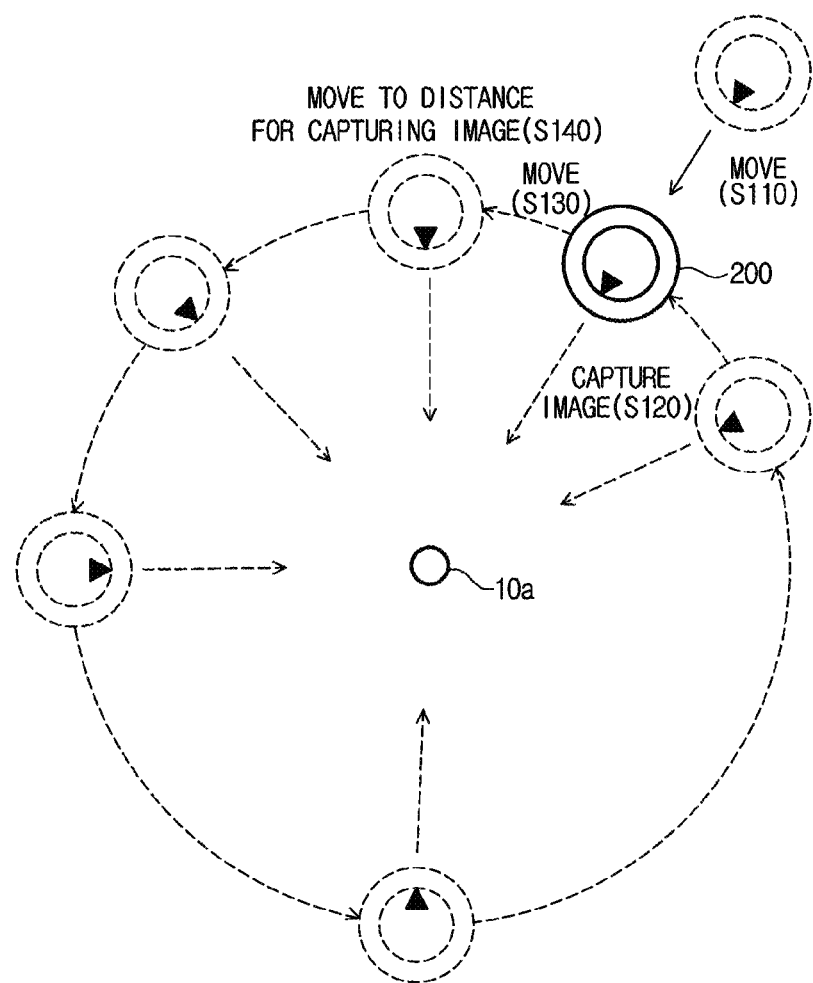
FIG. 11 is a view illustrating another registration method (2)

In operation S110 in FIG. 10, when a user installs the landmark object 10 in the image capturing direction of the camera sensor 210a and an operation command for instructing the mobile robot 200 to register the landmark object 10 is input to the mobile robot 200, the mobile robot 200 moves to an optimal distance for obtaining an image of the corresponding landmark object 10 (hereinafter, referred to as a registered image). For example, when it is assumed that a location spaced 30 cm apart from the landmark object 10 is optimal, the mobile robot 200 moves to the location spaced 30 cm apart from the landmark object 10 on the basis of distance information calculated by the distance calculator 214 and movement distance information calculated by the path calculator 212. FIG. 11 illustrates an example of the operation of the mobile robot 200. The reference numbers described in FIG. 10 correspond to the same operation described in FIG. 11.

The mobile robot 200, when it has moved to the optimal distance for obtaining the registration image, obtains an image of the landmark object 10 using the camera sensor 210a (S120).

In operation S130, when image capturing is completely finished, the mobile robot 200 moves toward a next image capturing location. It is useful to capture images of an overall perimeter of the landmark object 10 when a random landmark object 10 is registered, so the next image capturing location may be any location capable of capturing an image of the landmark object 10 at a different image capturing angle. The above movement path of the mobile robot 200 is calculated by the path calculator 212.

In operation S140, the mobile robot 200 moves to the next image capturing location calculated by the path calculator 212 (for example, a location rotated by 30 degrees), and then, moves to an optimal distance for obtaining a registration image as in the operation S110. In operation S150, the mobile robot 200, after having moved to the optimal distance for obtaining the registration image, obtains an image of the landmark object 10 using the camera sensor 210a.

In operation S160, whether the capturing of images of the overall perimeter is completely finished is determined and operations S130 through S150 are repetitively performed until the captured images of the overall perimeter are obtained. When the collection of the captured images of the overall perimeter is completed ("Yes" in S160), image features of the landmark object 10 are extracted from the obtained images through processing by the image storage portion 260, the feature extractor 220, and the processor 250 and are registered in the landmark feature storage portion 231.

2. Movement of Mobile Robot

Figure 12:
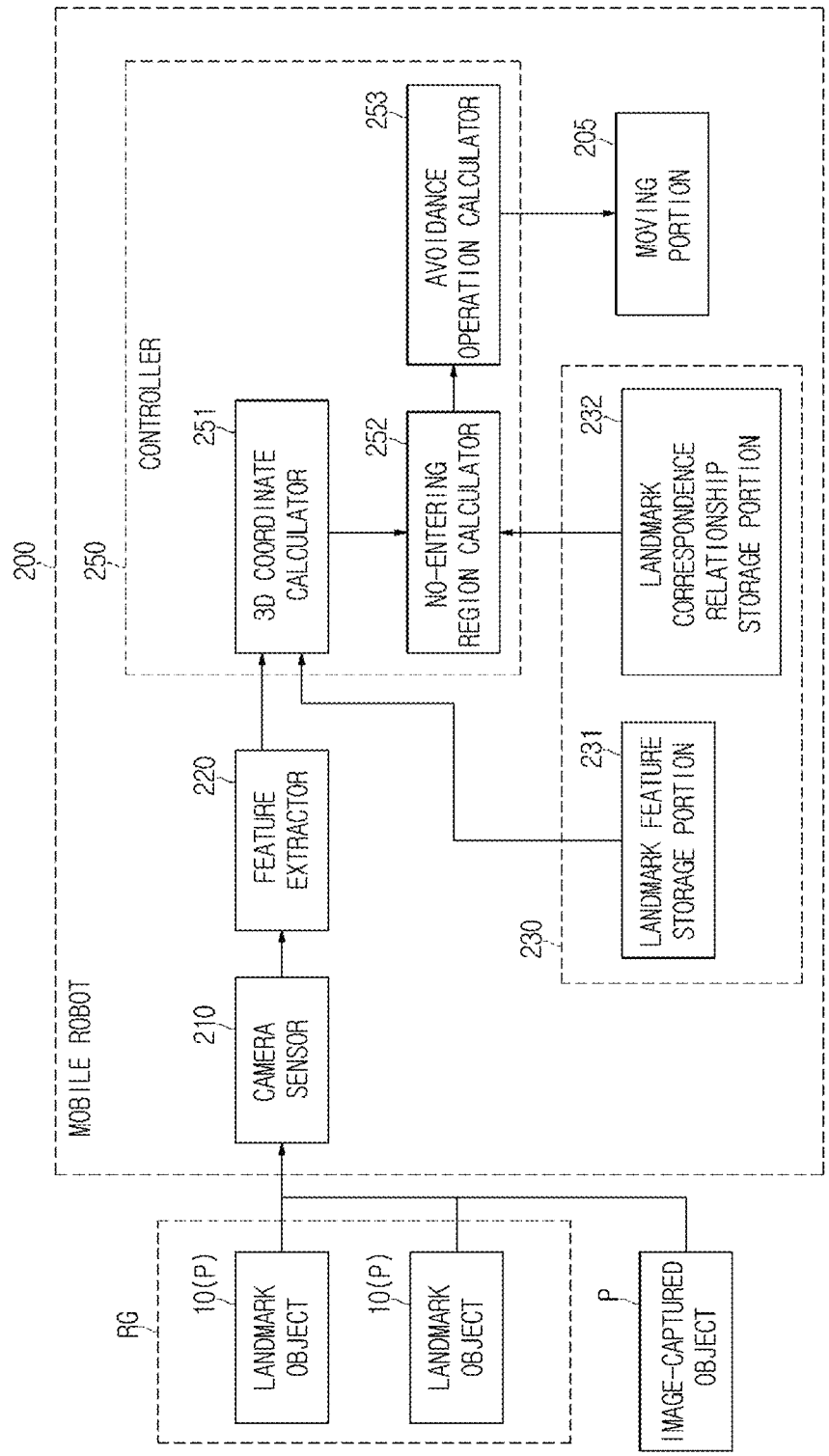
FIG. 12 is a block diagram illustrating components related to a moving operation of the mobile robot.

FIG. 12 illustrates components of the mobile robot 200 related to the embodiment, and particularly, block components related to a movement operation of the mobile robot 200. In FIG. 12, components capable of being jointly used in FIG. 2 are referred to with the same reference numerals.

As shown in FIG. 12, the mobile robot 200 includes the camera sensor 210a configured to be collect object information, the feature extractor 220, the memory 230, and the processor 250 configured to compare features. When the mobile robot 200 is an autonomously movable robot cleaner, the mobile robot 200 may further include a cleaning performer configured to clean while moving under the control of the processor 250. In other words, the movement of the mobile robot 200 may be controlled by the processor 250.

The feature extractor 220 is configured to extract image features of an object (hereinafter, referred to as an image-captured object P) collected by the camera sensor 210a. A shape and a type of the image features extracted by the feature extractor 220 are not particularly limited. For example, features of a shape or color of the image-captured object P may be extracted, or features of changes of parts with great changes in color or contrast in an overall image may be extracted.

The memory 230 includes the landmark feature storage portion 231, which stores image features of a landmark candidate object, and a landmark correspondence relationship storage portion 232, which stores a landmark group GR obtained by matching landmark objects which form a no-entering region NR.

The landmark candidate object is an object which becomes a candidate to be used for the landmark object 10 to define a movement of the mobile robot 200. In some embodiments, the landmark candidate object may be previously registered in the landmark feature storage portion 231. For example, the image features registered in the above-described "1. Registration of Landmark Object" may be used as the image of the landmark candidate object before moving the mobile robot 200. The above image features may be directly stored in the landmark feature storage portion 231 from the outside of the mobile robot 200 through a wireless or wired network. In other words, the user may register a random landmark object. For example, a rag doll, an ornament, or the like may be registered as the landmark object 10, and a trash can, a garden plant, or the like may be registered as the landmark object 10. Because it is unnecessary to prepare an exclusive landmark object, convenience is high and there is no worry about damage in a view of an installation place. Further, because it is unnecessary to connect a landmark object to an electrical outlet to connect power thereto or to replace a battery or the like of the landmark object to install the landmark object, convenience is high.

The processor 250 is configured to compare the image features of the image-captured object P extracted by the feature extractor 220 with the image features of the landmark candidate object stored in the landmark feature storage portion 231, and determine whether the landmark object 10 is included in the image-captured object P.

Figure 13:
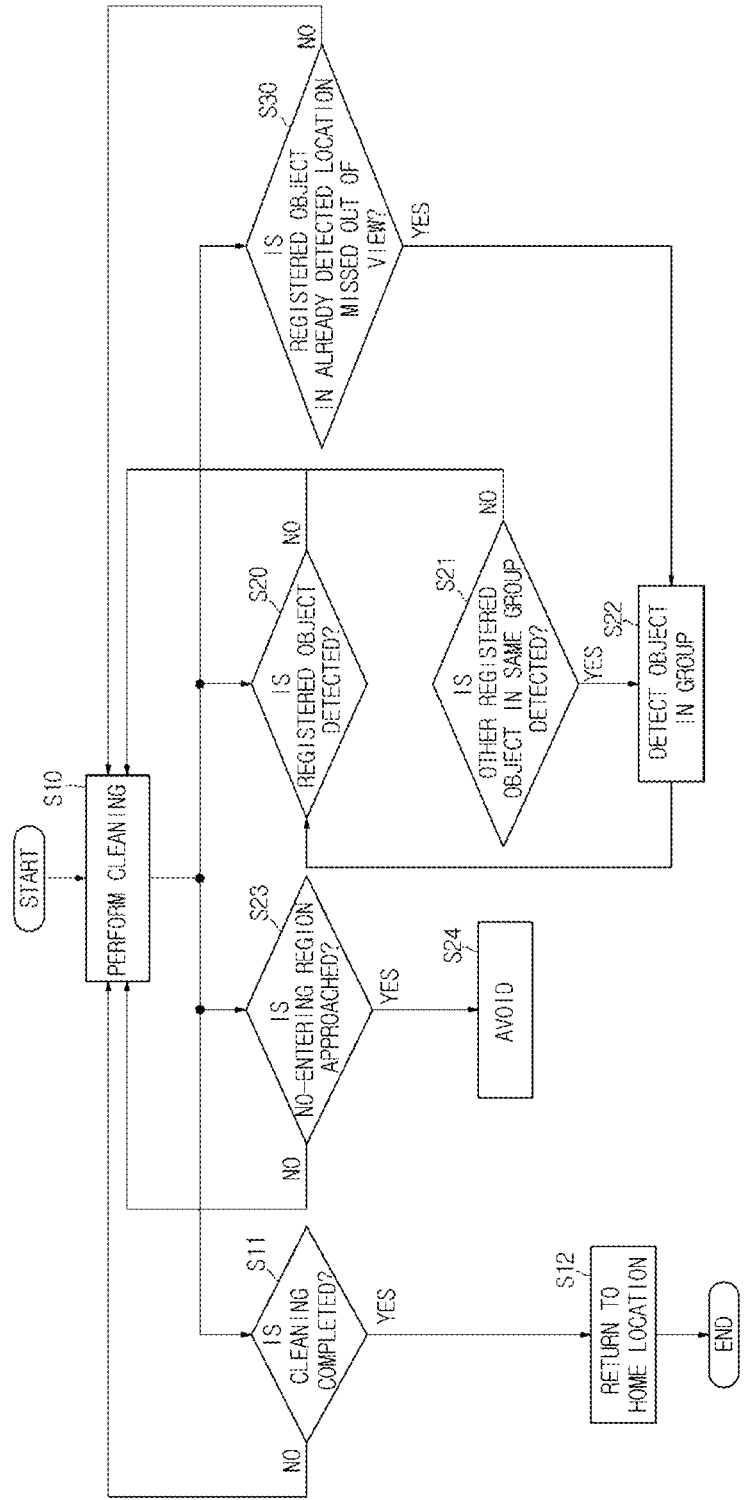
FIG. 13 is a flowchart illustrating a flow of one example of the moving (cleaning) operation of the mobile robot.

The processor 250 includes a three-dimensional coordinate calculator 251 as a location specification means, a no-entering region calculator 252, and an avoidance operation calculator 253. In embodiments where the mobile robot 200 is an autonomously movable robot cleaner, the processor 250 may control a robot cleaner (not shown) to perform cleaning. As shown in FIG. 13 described below, the processor 250 may control a detection operation of detecting another landmark object 10 which belongs to the same landmark group RG.

The three-dimensional coordinate calculator 251 is configured to estimate a movement trace of the mobile robot 200, including parts of an image-captured space in which the image features of the image-captured object P are arranged when the processor 250 has confirmed the presence of the landmark object 10, and estimate three-dimensional coordinates of the landmark object 10 in a movement space on the basis of an arrangement relationship with another object image-captured by the camera sensor 210a.

Figure 14:
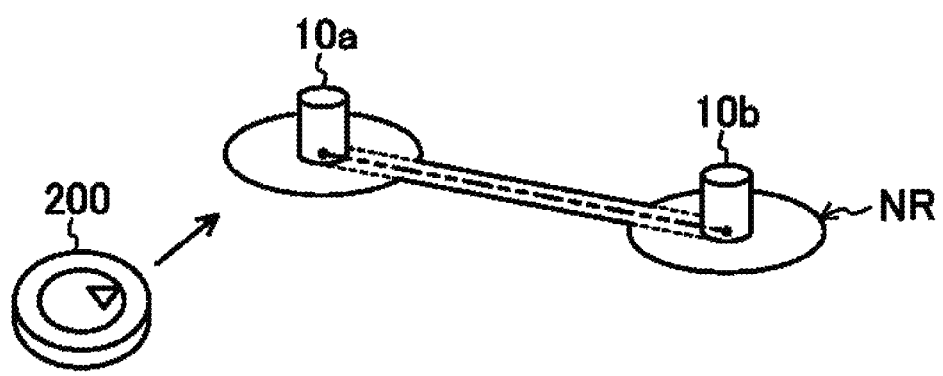
FIG. 14 is a view illustrating a no-entering region.

The no-entering region calculator 252 is configured to calculate and set no-entering regions NR on a perimeter of the landmark object 10 whose presence is confirmed. For example, when the presence of a single landmark is confirmed, a no-entering region with a certain area is set on a perimeter of the corresponding landmark object 10. The area and shape of the no-entering region may be preset by a manufacturing company during a manufacturing process or may be individually set by a user later. For example, a no-entering region in a circular shape with a diameter of several tens of cm may be set on the perimeter of the landmark object 10. In embodiments where the presence of a plurality of such landmark objects 10 is confirmed, a region in a linear shape which connects the landmark objects which belong to the same landmark group RG may be set as a no-trespassing region with reference to the landmark correspondence relationship storage portion 232. FIG. 14 mimetically illustrates a state in which a no-entering region NR (including a no-trespassing region) is set. In some embodiments, the trespassing region may be a strip shape with a certain width (refer to FIG. 14 for a solid line). In some embodiments, the trespassing region may be a region in a line shape with no width (refer to FIG. 14 for a two-dot chain line). A shape of the no-trespassing region, like the above-described no-entering region, may also be preset by a manufacturing company during a manufacturing process or may be individually set by the user. Meanwhile, in the following description, a movement in which the mobile robot 200 transits or crosses the no-trespassing region in a linear shape may also be referred to as entering the no-entering region.

The avoidance operation calculator 253 is configured to estimate a collision (entrance) of the mobile robot 200 with the no-entering region on the basis of the no-entering region NR calculated by the no-entering region calculator 252 and the movement trace of the mobile robot 200 set by the processor 250, and perform an adequate avoidance operation. The movement trace of the mobile robot 200 may be preset by a program of the processor 250 and may be adequately set according to a peripheral condition during a movement process, for example, when the mobile robot 200 is an autonomously movable robot cleaner, a waste-scattered condition or the like. In some embodiments, the adequate avoidance operation may be, for example, an operation of becoming spaced apart from the no-entering region NR or an operation of moving along the no-entering region NR.

Operations of Mobile Robot

Next, operations of the mobile robot 200 as an autonomously movable robot cleaner will be described in detail with reference to FIG. 13. An object for controlling the autonomously movable robot cleaner is, unless particularly stated, the processor 250. Also, the autonomously movable robot cleaner will be described while also being referred to as the mobile robot 200.

In operation S10, when a cleaning operation is completely finished, an autonomously movable robot cleaner 200, for example, performs cleaning while moving on the basis of a previously registered movement trace. During a cleaning period, the processor 250 confirms whether the landmark object 10 is included in an object P image-captured by the camera sensor 210a (S20).

When the cleaning is completely finished ("Yes" in S11) without detecting the landmark object 10 (referred to as a registered object in a description with reference to FIG. 13, "No" in S20), operation S12 is performed and the autonomously movable robot cleaner 200 performs an operation of returning to a home location such that the process is completely finished. Here, since the no-entering region is not set when the landmark object 10 is not detected, it is determined to be "No" in operations S23 and S24 as in operation S20.

Meanwhile, when the landmark object 10 is detected while the autonomously movable robot cleaner 200 moves three-dimensional coordinates of the landmark object are estimated by the three-dimensional coordinate calculator 251 and the no-entering region calculator 252 sets a no-entering region with a certain area on a perimeter of the landmark object. In operation S21, it is confirmed whether there is a landmark object which belongs to the same landmark group RG (hereinafter, referred to as a first group RG1) as that of the detected landmark object 10 (hereinafter, referred to as a first registered object 10a) with reference to the landmark correspondence relationship storage portion 232.

When there is no other landmark object 10 (except the first registered object 10a) registered in the first group RG1 ("No" in S21), operation S10 is performed again and the autonomously movable robot cleaner 200 returns to cleaning based on the movement trace. Here, when the autonomously movable robot cleaner 200 approaches the no-entering region NR set in the above ("Yes" in S23), an adequate avoidance operation is performed and cleaning is continuously performed (S24).

Meanwhile, when another landmark object 10 (hereinafter, referred to as a second registered object 10b) is registered in the first group RG1 ("Yes" in S21), the autonomously movable robot cleaner 200 detects the second registered object 10b.

Figure 15:
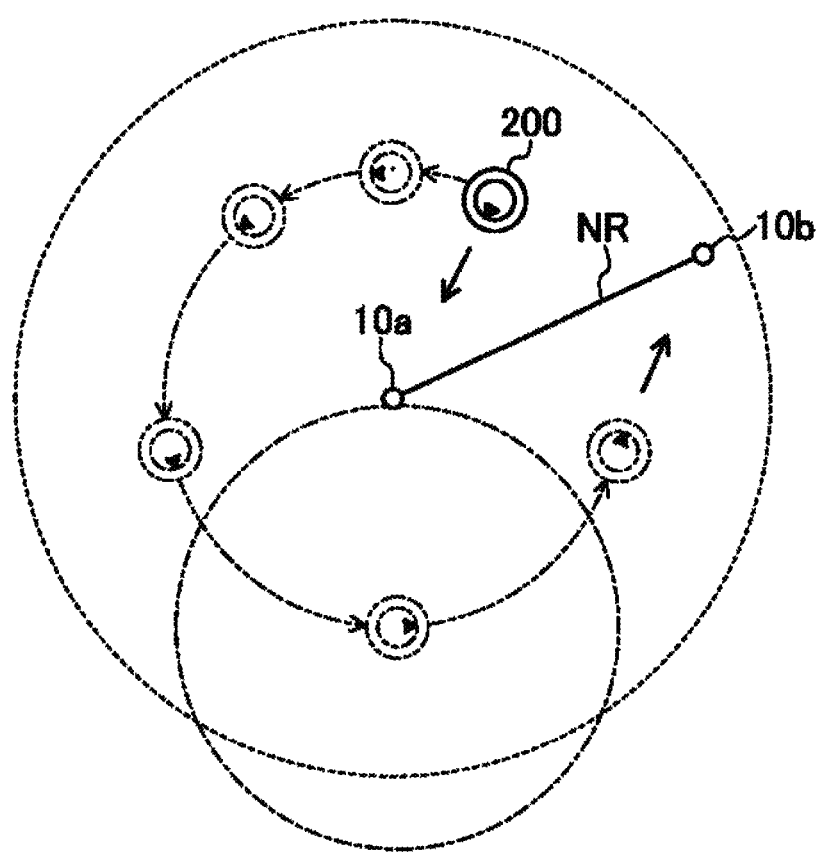
FIG. 15 is a view illustrating a detection operation.

FIG. 15 is a mimetic view illustrating one example of the movement trace of the autonomously movable robot cleaner 200 as the autonomously movable robot cleaner 200 performs a detection operation. In FIG. 15, a one-dot chain line indicates a range capable of being image-captured by the camera sensor 210a of the autonomously movable robot cleaner 200 and a two-dot chain line indicates the movement trace of the autonomously movable robot cleaner 200.

In the detection operation, the autonomously movable robot cleaner 200 confirms whether the second registered object 10b is present near the first registered object 10a. In detail, for example, as shown in FIG. 15, image-captured objects image-captured by the camera sensor 210a while moving on a periphery of a place spaced apart a certain distance from the first registered object 10a in a certain direction are confirmed. In embodiments where the camera sensor 210a is capable of capturing an image in every direction of the autonomously movable robot cleaner 200, as shown as a two-dot chain line in FIG. 15, it is confirmed whether the second registered object 10b is peripherally present while straightly moving in a circumferential direction. Meanwhile, when the camera sensor 210a is incapable of capturing an image in every direction of the autonomously movable robot cleaner 200, it may be confirmed whether the second registered object 10b is peripherally present while the autonomously movable robot cleaner 200 meanders to secure an image-capturing range. Although a movement radius in which the autonomously movable robot cleaner 200 meanders may be randomly set, the movement radius may be set according to an image-capturable distance of the camera sensor 210a in an aspect in which the autonomously movable robot cleaner 200 is allowed to detect the second registered object 10b while confirming the presence of the first registered object 10a. Also, in an aspect of allowing the second registered object 10b to be easily detected, an installable range of the second registered object 10b may be limited to be within a certain range (for example, a region inside a broken line of FIG. 15).

Subsequently, when the second registered object 10b is detected, the no-entering region calculator 252 may set a no-entering region NR on a periphery of the second registered object 10b and between the first registered object 10a and the second registered object 10b (refer to FIG. 15 for a solid line).

When the detection of the second registered object 10b is completed, operation S20 is performed again and whether another landmark object 10 which belongs to the first group RG1 (except the first and second registered objects 10a and 10b) is present is confirmed. Hereinafter, likewise, operations S20 to S22 are repetitively performed until there is no other landmark object. When there is no other landmark object 10, operation S10 is performed again and the autonomously movable robot cleaner 200 returns to cleaning based on the movement trace.

Figure 16:
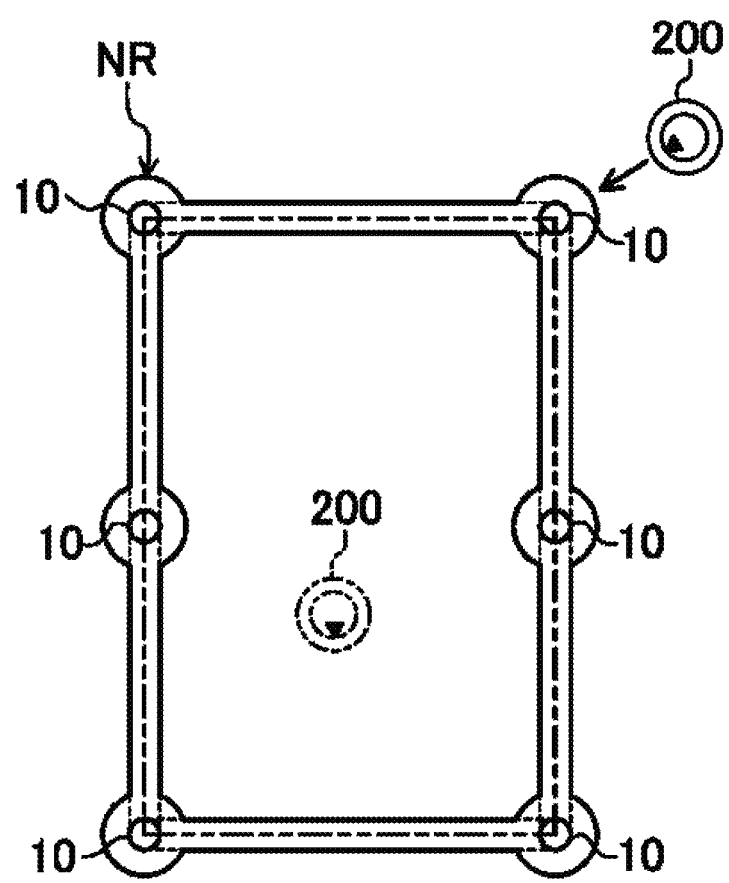
FIG. 16 is a view illustrating a no-entering region.

FIG. 16 illustrates an example in which six landmark objects 10 are registered in the same landmark group RG and are arranged to define a rectangular shaped region (hereinafter, referred to as a rectangular region). In an embodiment where the autonomously movable robot cleaner 200 is disposed outside the rectangular region (refer to FIG. 16 for a solid line), an inside of the rectangular region is determined to the no-entering region NR. In an embodiment where the autonomously movable robot cleaner 200 is disposed inside the rectangular region (refer to FIG. 16 for a two-dot chain line), an entire outside of the rectangular region is determined to the no-entering region NR.

In the following cleaning operation, when the landmark object 10 which belongs to another landmark group RG different from the first group RG1 (hereinafter, referred to as a second group RG2) is detected, operations S20 to S22 are performed. Also, when detection of the landmark object 10 which belongs to the second group RG2 is completely finished, the autonomously movable robot cleaner 200 repetitively performs the operation of returning to the cleaning based on the movement trace.

Figure 17:
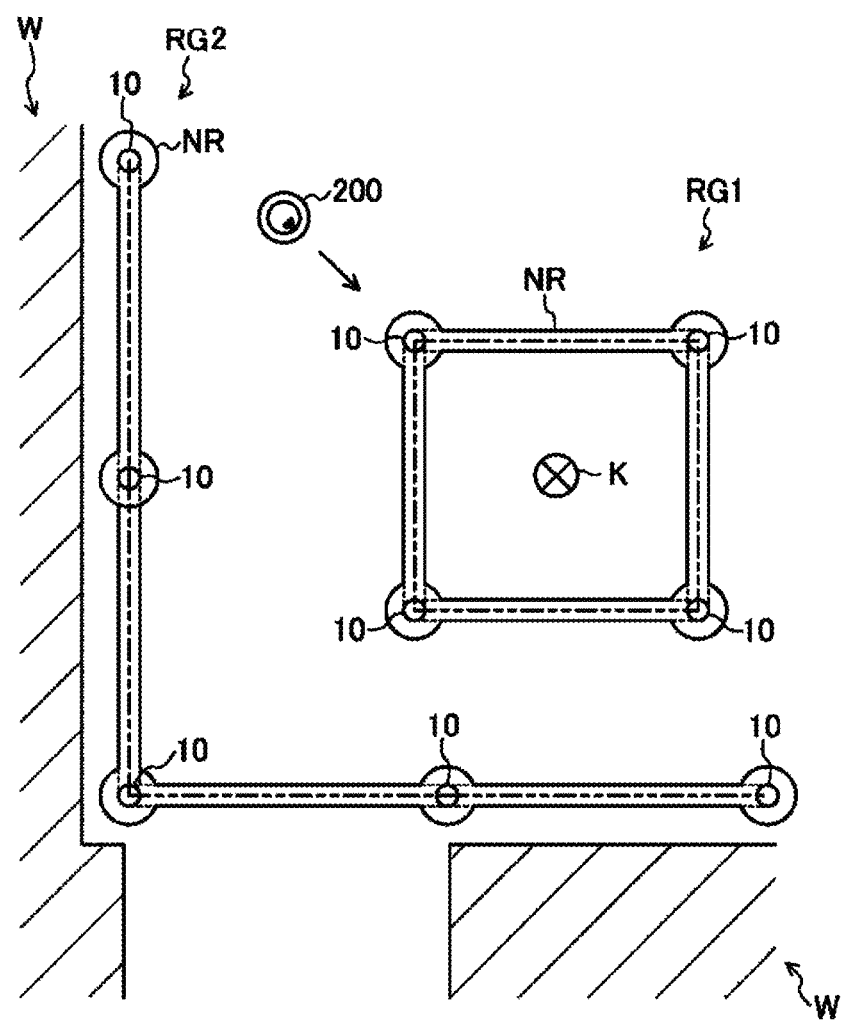
FIG. 17 is a view illustrating a no-entering region.

FIG. 17 illustrates an example in which four landmark objects 10 are registered in the first group RG1 and are arranged to define a rectangular shaped region (hereinafter, referred to as a rectangular region) around an object K to avoid a collision (for example, object K may be a vase or the like). FIG. 17 further illustrates an example in which five landmark objects 10 are registered in the second group RG2 and are linearly arranged along a wall W to avoid a collision with the autonomously movable robot cleaner 200.

As described above, according to the present embodiment, since the landmark object 10 and a location thereof are specified on the basis of a result of comparing a landmark candidate object previously registered in the landmark feature storage portion 231 with the image-captured object P, a random object may be used as the landmark object 10. Also, a no-entering region NR in a random shape may be set using a plurality of random objects (for example, landmark objects 10).

Another Embodiment

The above-described mobile robot may be configured as follows.

Figure 18:
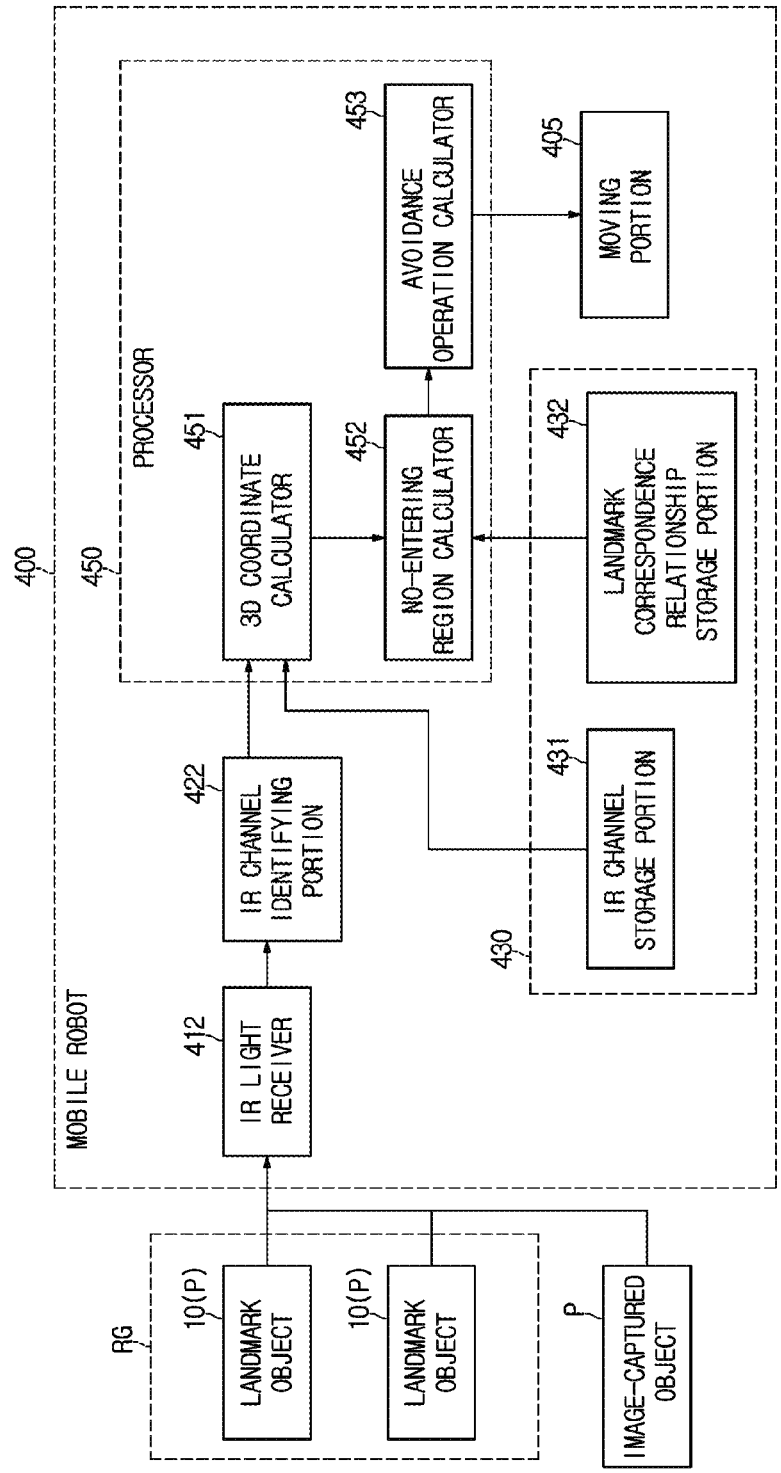
FIG. 18 is a block diagram illustrating another example of a configuration of the mobile robot.

FIG. 18 is a block diagram illustrating another example of a configuration of a mobile robot.

A mobile robot 400 shown in FIG. 18 includes functions of recognizing the randomly set landmark object 10, setting a no-entering region NR of the mobile robot 400 on the basis of a result of recognizing the landmark object, and controlling a movement to avoid the no-entering region NR. Hereinafter, differences from FIG. 12 will be mainly described.

The mobile robot 400 includes a moving portion 405 as a moving means, an IR light receiver 412 configured to collect object information, an IR channel identifying portion 422, a memory 430, and a processor 450 as a comparison means.

In the modified example, an IR light emission device P1 is disposed as the landmark object 10. In some embodiments, the IR light emission device P1 may be configured to allow the mobile robot 400 to distinguish mutual devices. For example, a frequency of IR light emitted by the IR light emission device P1 may be changed.

The IR light receiver 412 receives IR light emitted by the landmark object 10 (IR light emission device P1). For example, IR light is emitted toward every direction of the landmark object 10 such that the IR light receiver 412 may be allowed to recognize the landmark object 10 even when approaching the landmark object 10 in any direction.

The IR channel identifying portion 422 is configured to analyze a level of a frequency of IR light received by the IR light receiver 412 and identifies a frequency channel.

The memory 430 may include an IR channel storage portion 331, which stores a frequency channel of a landmark candidate object, and a landmark correspondence relationship storage portion 432, which stores a landmark group GR obtained by matching landmark objects 10 which form a no-entering region NR. The landmark correspondence relationship storage portion 432 has a configuration like that of the landmark correspondence relationship storage portion 232 of FIG. 12.

The processor 450 is configured to compare a frequency channel identified by the IR channel identifying portion 422 with a frequency channel stored in the IR channel storage portion 431 and specifies the landmark object 10 which emits the received IR light.

The processor 450 may include a three-dimensional coordinate calculator 451 as a location specification means, a no-entering region calculator 452, and an avoidance operation calculator 453.

The three-dimensional coordinate calculator 451 estimates three-dimensional coordinates of the landmark object 10 on the basis of a direction and a level of the received IR light when the presence of the landmark object 10 is confirmed on the basis of information received from the IR channel identifying portion 422 and the IR channel storage portion 431. The no-entering region calculator 452 calculates and sets no-entering regions NR to be set on a perimeter of the landmark object 10 whose presence is confirmed. A detailed method of setting the no-entering region NR and controlling of an avoidance operation by the avoidance operation calculator 453 are like those of the no-entering region calculator 252 and the avoidance operation calculator 253 of FIG. 12, and a repetitive description which overlaps the above description will be omitted.

The operations of the mobile robot 200 are performed on the basis of a flow like that of FIG. 13, and effects like those of the above-described embodiment may be obtained. That is, even in the configuration shown in FIG. 18, a plurality of IR light emission devices are used as landmark objects such that a no-entering region in a random shape may be set.

A no-trespassing region is not limited to a region in a linear shape and may be configured by connecting the plurality of landmark objects 10. For example, the no-trespassing region may be a region formed by connecting the plurality of landmark objects 10 in a circular arc shape.

The mobile robot 200 is not limited to the autonomously movable robot cleaner and may be applied to an autonomously movable robot carrier device or autonomously movable mobile robot, and the same effects may be obtained.

As is apparent from the above description, a mobile robot and a method of controlling the same can provide the following effects.

A no-entering region may be visually detected according to a position of placement of a landmark object.

Two or more no-entering regions may be set using a method of being connected with another landmark object.

A no-entering region may be set per unit region by using three or more landmark objects.

Although the present disclosure has been described with various embodiments, various changes and modifications may be suggested to one skilled in the art. It is intended that the present disclosure encompass such changes and modifications as fall within the scope of the appended claims.

What is claimed is:

1. A mobile robot comprising:
   a body;
   a driving system configured to move the body;
   a memory configured to store object information of a plurality of landmark candidate objects;
   a sensor configured to collect object information on an object near the mobile robot; and
   at least one processor configured to:
      compare the object information collected by the sensor with the object information of the landmark candidate object stored in the memory,
      recognize a location of a landmark object based on a result of comparison,
   wherein when locations of two landmark objects are recognized, the at least one processor is further configured to:
      set a no-entering region between the two landmark objects, and
      control the driving system to prevent the mobile robot from entering the no-entering region,
   wherein when the landmark candidate object is asymmetrical, the at least one processor is further configured to:
      control the sensor to collect object information of different aspects of the landmark candidate object in a circumferential direction of the landmark candidate object, and
      store the object information of the landmark candidate object, which is asymmetrical, in the memory on a basis of the object information collected by the sensor.

2. The mobile robot of claim 1, wherein:
   the memory is further configured to store at least one landmark group obtained by grouping the plurality of landmark candidate objects, and
   the at least one processor is further configured to set the no-entering region between landmark objects that belong to a same landmark group of the landmark objects.

3. The mobile robot of claim 2, wherein when the location of the landmark object is recognized and another landmark candidate object is present in the landmark group to which the landmark object belongs, the sensor is further configured to collect the object information to detect whether the other landmark candidate object is present near the landmark object.

4. The mobile robot of claim 3, wherein the at least one processor is further configured to compare the object information collected by the sensor with the object information of the landmark candidate object stored in the memory, recognize a location of another landmark object that is an object of the other landmark candidate object on a basis of a result of comparison, and set the no-entering region between the landmark object and the other landmark object.

5. The mobile robot of claim 1, wherein the at least one processor is further configured to set the no-entering region, that connects the two landmark objects to each other, between the two landmark objects.

6. The mobile robot of claim 1, wherein the at least one processor is further configured to set the no-entering region with a certain area around each landmark object and the certain area is centered on each landmark object.

7. The mobile robot of claim 1, wherein the at least one processor, when it is confirmed that the landmark object is not present in the recognized location, is further configured to remove the no-entering region.

8. The mobile robot of claim 1, wherein the sensor comprises at least one of an image obtainer, that obtains image information with respect to an image capturing direction, or an infrared (IR) light receiver, that receives IR light emitted by the landmark object.

9. The mobile robot of claim 8, wherein:
   the memory is further configured to store image information of the plurality of landmark candidate objects as the object information, and
   the at least one processor is further configured to:
      compare the image information collected by the image obtainer with the image information of the landmark candidate objects stored in the memory, and
      recognize the location of the landmark object.

10. The mobile robot of claim 8, wherein the at least one processor is further configured to:
   separate the landmark candidate object and background in the image information obtained by the image obtainer,
   extract feature information of the landmark candidate object from the image information, and
   store the feature information as the object information of the landmark candidate object in the memory.

11. The mobile robot of claim 10, wherein the at least one processor is further configured to:
   store a background image obtained by the image obtainer when the landmark candidate object is not present in the image capturing direction, in the memory,
   subtract the background image from an image, in which the landmark candidate object is present, obtained by the image obtainer, and
   extract the feature information of the landmark candidate object, that is present in the image capturing direction, from image information of the image from which the background image is subtracted.

12. The mobile robot of claim 10, wherein the at least one processor is further configured to:
   extract a local feature of the landmark candidate object from the feature information of the landmark candidate object, and
   store the local feature in the memory as the object information of the landmark candidate object.

13. The mobile robot of claim 12, wherein:
   the image obtainer is configured to sequentially obtain images in the image capturing direction for a certain period of time, and
   the at least one processor is further configured to store a local feature, that accompanies sequential changes, among local features with respect to the image obtained by the image obtainer as the object information of the landmark candidate object in the memory.

14. The mobile robot of claim 13, wherein:
   the memory is further configured to store features of a human body, and
   the at least one processor is further configured to store some of the local features that accompany the sequential changes, except the features of the human body, as the object information of the landmark candidate object in the memory.

15. The mobile robot of claim 8, wherein the at least one processor, when the landmark candidate object in the image capturing direction obtained by the image obtainer is asymmetrical, is further configured to:
   control the image obtainer to obtain a plurality of pieces of image information of the landmark candidate object from a plurality of angles in the circumferential direction of the landmark candidate, and
   store the object information of the landmark candidate object in the memory on a basis of the obtained plurality of pieces of image information.

16. The mobile robot of claim 8, further comprising a transceiver that is configured to transmit a viewed image in the image capturing direction obtained by the image obtainer to a terminal device and receive landmark region information that indicates the landmark object in the viewed image from the terminal device.

17. The mobile robot of claim 16, wherein the at least one processor is further configured to store image features of the landmark object in the memory on a basis of the landmark region information, compare a feature information of the image information obtained by the image obtainer with the feature information of the landmark object stored in the memory, and recognize the landmark object on a basis of a result of comparing, by the at least one processor, the feature information and controls the driving system.

18. A method of controlling a mobile robot comprising a body, driving system configured to move the body, a memory configured to store object information of a plurality of landmark candidate objects, and a sensor configured to collect information on an object near the mobile robot, the method comprising:
   collecting object information of different aspects of the landmark candidate object in a circumferential direction of the landmark candidate object when the landmark candidate object is asymmetrical;
   storing the object information of the landmark candidate object, which is asymmetrical, in the memory on a basis of the object information collected by the sensor;
   comparing the object information collected by the sensor with the object information of the landmark candidate object stored in the memory;
   recognizing a location of a landmark object based on a result of comparison;
   setting, when locations of two landmark objects are recognized, a no-entering region between the two landmark objects; and
   controlling the driving system to prevent the mobile robot from entering the no-entering region.

19. The method of claim 18, wherein:
   the memory stores at least one landmark group obtained by grouping the plurality of landmark candidate objects, and
   the setting of the no-entering region between the two landmark objects when the locations of the two landmark objects are recognized comprises:
      setting the no-entering region between the two landmark objects that belong to a same landmark group; and
      removing the set no-entering region, when at least one processor has confirmed that the landmark object is not present in the recognized location.

20. A robot cleaner comprising:
   a body;
   a driving system configured to move the body;
   a memory configured to store object information of a plurality of landmark candidate objects;
   a sensor configured to collect information on an object near the robot cleaner; and
   at least one processor configured to:
      compare the object information collected by the sensor with the object information of the landmark candidate object stored in the memory,
      recognize a location of a landmark object based on a result of comparison,
   wherein when locations of two landmark objects are recognized, the at least one processor is further configured to:
   set a no-entering region between the two landmark objects, and
   control the driving system to allow the robot cleaner to clean without entering the no-entering region,
   wherein, when the landmark candidate object is asymmetrical, the at least one processor is further configured to:
      control the sensor to collect object information of different aspects of the landmark candidate object in a circumferential direction of the landmark candidate object; and
      store the object information of the landmark candidate object, which is asymmetrical, in the memory on a basis of the information collected by the sensor.

* * * * *

UNITED STATES PATENT AND TRADEMARK OFFICE
CERTIFICATE OF CORRECTION

| | |
|---|---|
| PATENT NO. | : 10,782,702 B2 |
| APPLICATION NO. | : 15/885575 |
| DATED | : September 22, 2020 |
| INVENTOR(S) | : Yoshiaki Akazawa |

It is certified that error appears in the above-identified patent and that said Letters Patent is hereby corrected as shown below:

On the Title Page

Add item (30) Foreign Application Priority Data:
--Feb. 3, 2017 (JP) ..........2017-018744
Oct. 23, 2017 (JP) ..........2017-204383
Dec. 13, 2017 (KR) .........10-2017-0171444--.

Signed and Sealed this
Third Day of May, 2022

Katherine Kelly Vidal
*Director of the United States Patent and Trademark Office*